US008225377B2

(12) United States Patent
Maffione et al.

(10) Patent No.: US 8,225,377 B2
(45) Date of Patent: Jul. 17, 2012

(54) METHOD AND SYSTEM FOR HANDLING CONTENT DELIVERY IN COMMUNICATION NETWORKS

(75) Inventors: Eugenio Maria Maffione, Turin (IT); Giovanni Gambaro, Turin (IT)

(73) Assignee: Telecom Italia S.p.A., Milan (IT)

( * ) Notice: Subject to any disclaimer, the term of this patent is extended or adjusted under 35 U.S.C. 154(b) by 1131 days.

(21) Appl. No.: 11/578,051

(22) PCT Filed: Apr. 14, 2004

(86) PCT No.: PCT/EP2004/003925
§ 371 (c)(1),
(2), (4) Date: Oct. 12, 2006

(87) PCT Pub. No.: WO2005/101782
PCT Pub. Date: Oct. 27, 2005

(65) Prior Publication Data
US 2008/0276304 A1 Nov. 6, 2008

(51) Int. Cl.
*G06F 7/04* (2006.01)
(52) U.S. Cl. .......................................................... 726/4
(58) Field of Classification Search ....... 726/4; 713/160
See application file for complete search history.

(56) References Cited

U.S. PATENT DOCUMENTS

| 6,130,892 | A | 10/2000 | Short et al. | |
|---|---|---|---|---|
| 6,636,894 | B1 | 10/2003 | Short et al. | |
| 6,779,118 | B1* | 8/2004 | Ikudome et al. | 726/7 |
| 7,240,100 | B1* | 7/2007 | Wein et al. | 709/214 |
| 2003/0118038 | A1* | 6/2003 | Jalava et al. | 370/401 |
| 2005/0021943 | A1* | 1/2005 | Ikudome et al. | 713/160 |
| 2006/0174019 | A1* | 8/2006 | Ikudome et al. | 709/229 |
| 2007/0294417 | A1* | 12/2007 | Ikudome et al. | 709/229 |

FOREIGN PATENT DOCUMENTS

EP 1 317 111 6/2003

(Continued)

OTHER PUBLICATIONS

Cisco ACNS Software Caching and Streaming Configuration Guide, Release 5.1, 2003, Retrieved date Jul. 10, 2010, Chapter 8, 43 pages.*

(Continued)

*Primary Examiner* — Samson Lemma
(74) *Attorney, Agent, or Firm* — Finnegan, Henderson, Farabow, Garrett & Dunner, L.L.P.

(57) ABSTRACT

A system for handling transactions in a communication network, wherein the transactions include at least one technology-dependent request for a given content made by a requester to at least one server. The system operates based on an access content list including permit/deny access clauses regulating access of the requesters to the contents by the server. A processing module, configured for detecting the technology-dependent request, and extracting therefrom information identifying the requester making the request and the content requested, is provided. A corresponding technology independent access content entry, adapted to be checked against the access content list to derive permit/deny information concerning the request detected, can thus be generated. The request is handled as a function of the permit/deny information derived and thus, e.g., forwarded toward the server or either dropped or forwarded to an alternative destination. Access to the various contents delivered is thus controlled in a manner that is independent of the specific technologies used for delivering the media contents.

42 Claims, 20 Drawing Sheets

FOREIGN PATENT DOCUMENTS

| WO | WO-99/57866 | 11/1999 |
|----|----|----|
| WO | WO-01/31886 A2 | 5/2001 |
| WO | WO-02/35797 A2 | 5/2002 |
| WO | WO-03/098408 | 11/2003 |

OTHER PUBLICATIONS

Microsoft; "Windows Media 9 Series Deployment Guide", p. 47-51, (2002).

"Helix Universal Server Administration Guide, Version 9.0"; Real Networks, pp. 247-299, (2003).

Cisco; "CISCO ACNS 5.1 Caching and Streaming Configuration Guide, Release 5.1", pp. iii to xix, and 8-1 to 8-44, Text Part N.OL-4070-01, (2003).

CISCO; "CISCO Content Service Switch Basic Configuration Guide, Version 7.20"; Chapters 3 and 5, pp. iii to xviii, and 3-1 to 3-64 and 5-16 to 5-49, Text Part No. 78-13886-05, (2003).

\* cited by examiner

Fig.-18

| Action | Src IP | Dst IP | Protocol | In Port | Out Port | H.D. | Content | TTL |
|---|---|---|---|---|---|---|---|---|
| Accept/Deny | IP Address | IP Address | TCP/UDP | Port N. | Port N. | Domain | URL | secs |

Fig_19

METHOD AND SYSTEM FOR HANDLING CONTENT DELIVERY IN COMMUNICATION NETWORKS

CROSS REFERENCE TO RELATED APPLICATION

This application is a national phase application based on PCT/EP2004/003925, filed Apr. 14, 2004, the content of which is incorporated herein by reference.

FIELD OF THE INVENTION

The invention relates to content delivery in communication networks.

The invention was developed by paying specific attention to the possible application in an Internet scenario, e.g. for controlling access to media contents in those operational contexts wherein one or more "vertical" technologies are used for delivering and accessing media contents within a mobile and/or fixed network.

DESCRIPTION OF THE RELATED ART

In recent years, services available on the Internet and/or within corporate intranets and based on delivering media contents (especially of the multimedia type) have achieved a particular significance. This is supported both by the availability of wider transmission bandwidths for access, and by the steady increase in the number and types of the contents available for delivery.

In addition to the traditional web contents, other "rich" multimedia contents such as video streaming (both on demand and live) now provide services that are particularly important for the users (E-learning, Internet Broadcasting, Video On Demand, . . . ). This scenario becomes continuously richer and richer due to new types of contents that are typically supported by vertical platforms provided by specific and specialised providers: exemplary of these are platforms for gaming-on-demand and application-on-demand.

essentially includes two functional blocks that are physically located at different points:

- on the one side, the Content Requester CR includes a user terminal and related software loaded into it, both components being located at the user site (possibly including a cellular phone), and
- on the other side, the service centre CP includes batteries of servers 10, 12 each arranged to provide a given set of service in respect of a given technology, depending on the number of simultaneous requests intended to be managed. Each battery 10, 12 has associated a respective authorisation server 10a, 12a, as well as a correspondingly associated authorisation database 10b, 12b. Each set comprised of a battery of servers, the corresponding authorisation server and the associated database is currently referred to as a "content farm".

In brief, in the centralized arrangement shown in FIG. 1 the service centre CP will have to include—by necessity—a number of different content farms corresponding to the number of different technologies intended to be supported by the centre.

By specifically referring to the technologies by Microsoft and Real Networks referred to in the foregoing, an arrangement as depicted in FIG. 1 requires different, respective procedures and mechanisms for managing authorisation for accessing the respective contents. These procedures and mechanisms are not directly compatible: for instance, access and/or authorisation may be controlled by means of proprietary plug-ins that perform controls over the file system storing the contents of the IP addresses of the accessing users.

In other technologies, authorisation is based on checking an external table, which can be comprised of a simple text file, a database in a proprietary format or an open SQL (Structured Query Language) database.

To sum up, an arrangement such as disclosed in FIG. 1 requires that not just the batteries or banks of servers 10, 12 are univocally devoted to a single content technology: the same partitioning does in fact apply also to the method and system performing the authorisation tasks. This requires managing and control components that are specialised and dedicated for each and every technology, each component being in fact incompatible with homologous components for the other technologies possibly present in the service centre.

This means i.e. that when a new content delivery technology is added to the centre, no practical possibility exists of taking advantage of any facility already installed and thus benefiting from any scale factors.

Due to the broadening perspective of new type of contents (gaming-on-demand, application-on-demand, and so on) and the possible offer of new vertical solutions by technological vendors, the authorisation software/hardware components and processes run the risk of becoming a real problem for providers running service centres.

In addition to those centralized architectures based on the concept of Service Center, an evolution has been traced in recent times toward the arrangement shown in FIG. 2. This is essentially a so-called content distribution network (CDN) arrangement.

In a CDN context (as disclosed, for instance, in "Cisco ACNS 5.1 Caching And Streaming Configuration Guide, Release 5.1", 2003, Cisco, pages 227-270, Text Part N.OL-4070-01), peripheral servers designated "surrogate" servers 14 take the place of the centralized servers of the arrangement of the FIG. 1. The surrogate servers are physically located closer to the users (whereby the network N shown in FIG. 2 is essentially comprised of the access and metropolitan network and generally no longer comprises the transport network proper). In that way, the surrogate servers 14 are in a position to deliver the contents by exploiting a larger bandwidth.

In the arrangement shown in FIG. 2, any request submitted by the Content Requester CR is re-routed via a central system (designated content router CDNCR) toward a server 14 wherein the contents requested are available. Such a server 14 is selected as the most suitable one in terms of resources available and "distance" over the network. After such a re-routing process (content routing), the process of accessing to the contents on the surrogate server selected is essentially analogous to the process that takes place in the arrangement of FIG. 1.

In a typical embodiment, the CDN architecture belongs and is managed by a network operator that offers to several content providers the possibility of using the CDN infrastructure to facilitate distribution and delivery of the respective contents.

A typical feature of the surrogate servers 14 in a CDN is that they are not dedicated to a single content technology: they are in fact designated to serve simultaneously requests for different types of contents (for instance Real, Windows Media and so on). Consequently, they essentially behave as multi-technology servers due to their ability of integrating the service components of the various technologies, thus letting those components co-exist within a single surrogate server 14.

The CDN architecture shown in FIG. 2 is not exempt from a certain degree of complexity. In addition to scale factor problems related to managing the authorisation processes for the different technologies used (with the ensuing need of having a specific authorisation module 14a available for each specific technology), an additional problem arises due to the likelihood for the contents on each surrogate server 14 of being related to different content providers, having different authorisation/licensing policies.

This in fact adds to the complexity of the process of authorising access, thus making it practically impossible to handle in an accurate and "granular" way the authorisation criteria and methods to the contents made available by different content providers. Adding new contents technologies (such as gaming-on-demand or application-on-demand) to a distributed architecture as shown in FIG. 2 may turn out to be even more complex than in the case of the centralized arrangement shown in FIG. 1.

In fact, in both the architectures shown in FIGS. 1 and 2, controlling access to the contents becomes a critical issue for both the network operator and the content provider, especially as regards billing by the operator. This becomes particularly evident if one considers the case of a service that, based on a subscription to the service itself, provides for an undifferentiated access to the contents. This may be the typical case of a subscription to a residential ADSL service. When passing from that service to access based on a pre-paid billing wherein billing is differentiated as a function of the specific contents requested (as it may be the case for pre-paid access via a cellular phone), the possibility of detecting under real-time conditions—i.e—at the time the request is made—possible attempts at a fraudulent access becomes a strategic (if not vital) issue.

Possible real-time control is not per se univocally related to real-time intervention against the fraudulent approach. In fact an operator may decide—under specific circumstances—to tolerate a fraudulent attempt for a certain amount of time, while reserving the right to take the most appropriate action in view of e.g. specific marketing approaches.

In that respect, most prior art arrangements are based on approaches wherein a control device is provided adapted to act in a transparent manner on the data flow between the user and the server providing the service while performing access control based on certain internal rules.

For instance, in the "Cisco Content Service Switch Basic Configuration Guide, Version 7.20", March 2003, Cisco, Chapter 3 and 5, Text part number 78-13886-05, a set of devices, designated CSS (Content Service Switch) is disclosed adapted to operate on the data flow between a client and a server. The devices define static rules applied to the client/server traffic. These are adapted to be applied to groups of clients (having certain subnet or IP addresses, servers, having certain IP address or DNS domains), content types (e.g. filename extension or URL), based on pre-definable lists configured on various apparatus. Based on such a rules (programmed from outside), the device analyses the traffic and decides how this is to be handled, that is whether a certain traffic is to be forwarded without modification, filtered to block transit thereof or re-directed towards alternative destinations (this is typical the case when the service is unable to reach certain contents).

Such devices require by necessity that the authorisation rules are pre-set in the devices themselves. This turns out to be critical solution for at least two reasons.

A first reason is related to the maximum number of authorisations that can be configured. This number is likely to reach a very high value, generally higher than the capacity of the system itself (25,000 rules as a whole), all the possible user/contents combination having to be taken into account. In a typical embodiment, 100 access lists designated Access Control Lists (ACL) can be defined each adapted to include—at most—254 "clauses". Within each clause the possibility exists of defining a single user and a single content or groups of users and/or contents. In practice, all these groups are static by themselves and they are in no way helpful in composing rules.

A second critical factor lies in that pre-configuring such rules does not permit dynamic control of authorisations. It is not possible to enable or disable a certain user in respect of certain contents depending on condition that may vary rapidly and externally to the device itself e.g. as a result of a new subscription being activated, credit being exhausted, new credit being acquired, promotional campaigns.

In WO-A-99/57866 discloses a data redirection system for redirecting user's data based on a stored rule set. The corresponding approach is based on an Application Proxy. This is particularly cumbersome in terms of device requirements, in that it requires an emulation application module for each service/technology supported by the system. A dedicated, technology-dependent software module is thus required for each technology to be handled. An additional problem lies in that such specific software module may not be available for integration in the system. This may be the case when the content distribution technologies involved are proprietary technologies, a fairly current situation for e.g. gaming-on-demand or application-on demand.

A further alternative arrangement is disclosed in a number of documents assigned to Nomadix, Inc., such as U.S. Pat. No. 6,130,892, U.S. Pat. No. 6,636,894, WO-A-01/31886 or WO-A-02/35797.

The Nomadix solution can be applied to the access network for filtering the contents delivered by a Content Delivery architecture by fulfilling three basic requirements:

analyzing the request packet from the Content Requester, without requiring additional software modules dedicated to the protocol or the content delivery technology, forwarding and receiving the authorization request sent towards an external server, and actuating the authorization by possibly denying or redirecting the original request from the user (which however requires specific software modules for application redirection).

In addition to the problem of application scalability, which is related to re-direction, the Nomadix device exhibits a number of critical points in respect of using Content Distribution services in the contexts considered in the foregoing.

As a first point, the Nomadix device is located on the telecom operator access network. This turns out to be a heavy implementation penalty for the operator. This is particularly true in the case of a fixed network, in that it requires a high number of devices in comparison with other arrangements where location is closer to the delivery source (that is with the Content Site of the CDN or with the Service Center in a centralized architecture).

Secondly, the Nomadix device controls and blocks the request coming from the client. As a result, the time involved in the process of receiving the client request, obtaining authorization with a centralized system, providing a subsequent response and actually forwarding the request may be so long to give rise to an application time out, on the Content Requester or the Content Server. Such arrangement is not adapted for use in a mobile context where compliance with real-time requirements is vital to ensure security against fraudulent behaviours while, on the other hand, transmission latencies may not be minor.

Finally when the Nomadix device support service accounting, it issues an accounting record based exclusively on the content request. In the case of an anomaly in the response by the delivery server, this may result in false signalling (and incorrect billing) while the possibility does not exist of providing a count of the time the contents were actually delivered since the end of delivery is not detected.

OBJECT AND SUMMARY OF THE INVENTION

The need is therefore felt for arrangements adapted to overcome the limitations of the prior art arrangement considered in the foregoing by adding e.g. further functions adapted for accounting, while giving rise to a real-time authorisation (and accounting) mechanism adapted to control access to contents. Specifically, the need is felt for arrangements wherein technology-independent, dynamic control criteria allow a high degree of freedom in selecting the "granularity" of the control action. This will permit to freely refer in that respect to parameters such as subnet/URL/user/logical grouping of contents in a combination selected freely by acting indifferently both on the request flow and the response flow (contents being delivered) by proving in parallel a more comprehensive support for accounting purposes.

The object of the present invention is to provide an arrangement fulfilling these needs.

According to the present invention that object is achieved by means of a method having the features set forth in the claims that follow. The invention also relates to a corresponding system, a related network as well as a related computer program product loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is thus a system for handling transactions in a communication network, wherein the transactions include at least one technology-dependent request for a given content made by a requester to at least one server. The system operates based on an access content list including permit/deny access clauses regulating access of the requesters to the contents provided by the server. A processing module is provided configured for detecting the technology-dependent request, and extracting therefrom information identifying the requester making the request and the content requested. A corresponding technology-independent access content entry can thus be generated adapted to be checked against the access content list to derive permit/deny information concerning the request detected. The request is handled as a function of the permit/deny information derived and thus e.g. i) forwarded toward the server, or ii) either dropped or forwarded to an alternative destination. Access to the various contents delivered is thus controlled in a manner that is independent of the specific technologies used for delivering the media contents.

The arrangement described herein is thus adapted to perform a control action in respect of any of:
the type of contents (image, file, video stream, web pages),
the type of protocol used for delivering the contents toward the user (http, https, http progressive, mms, rtsp, ftp, . . . ),
the delivery architecture (centralised server, surrogate servers or CDN),
the type of client requesting delivery of contents (Set Top Box, personal computer, cellular phone, . . . ),
the type of IP connectivity (wireless, GPRS, Ethernet, . . . ).

A particularly preferred embodiment of the invention provides for the presence of a centralized control component (acting as a content and policy security server) adapted to verify in real-time conditions the user/contents authorisations to manage in a unitary way the authorisations for all the technologies and content types (current and future). This operating primarily on the user identifier and on reference to the content requested, thus unifying the authorisation method.

Additionally, at least one network device is preferably provided that acts as a dynamic conditional content access (DCCA) gateway. Such a gateway may be adapted to perform, for all the (current and future) content technologies the following functions:
transparent traffic analysis, by enforcing a bilateral control logics for the request, acting on the requests themselves or acting on the return traffic toward the user, while also taking into account—at all levels (datalink, network, transport and application)—the information derivable therefrom. This analysis is referred to as "transparent" in so far as it is performed without modifying the IP architecture, and is capable of acting in a switched/bridged arrangement (level 2 of the OSI stack);
receiving and forwarding authorisation requests toward the central control component, based on an unitary format for all the types of contents, by identifying the content requested and the user in a manner that is thoroughly independent of the specific characteristics of the technologies adapted for distributing contents (type of contents; protocol, client, server, architecture, connectivity);
enforcing the authorisation on the flow with a bilateral approach by stopping the request flow without forwarding it to the content server (e.g. in line-control acting on the request) or by blocking the return flow toward the content requester (e.g. delayed control active on the response), while controlling the flow itself for supporting the accounting function;
possibly re-directing the request, when control is performed on the request, based on the same transparent criteria considered for analysis purposes, thus modifying reference to the contents requested contained in the packet payload while maintaining active the communication session established with the content server, without the intervention of any software module specifically dedicated to a given technology.

A preferred embodiment of the arrangement described herein provides for the network device in question to be deployed in the connection towards the battery or bank of content servers of the service centre, either by being co-located therewith or by being arranged on the connection towards the surrogate servers at each site in CDN architecture by being co-located on the same site. In that way the resulting arrangement is significantly more efficient in comparison with those arrangements based on location at an access point to the network itself: this latter arrangement may however be still implemented should need arise.

To sum up, the arrangement described herein meets all the possible needs for dynamic control of content access listed in the foregoing.

Specifically, the arrangement described herein provides a solution that is:

fully transparent in respect of the content delivery architecture, the client and the content as well as the IP architecture used, due i.e. to the possibility of operating as a switched/bridged arrangement;

scalable, in that the portion devoted to processing the authorisation (in a centralised fashion) is distinct from the part devoted to the triggering/filtering action;

highly granular in its nature as it permits a definition of the access permissions to the contents based on any information items adapted to be derived at the datalink, network, transport and application levels;

highly configurable, as it permits real-time management of access authorisations both based on the content request and in a delayed fashion by acting on the return flow, being thus compatible with content based services of new types requesting real-time billing such as those based on pre-paid billing, while allowing for non-negligible connectivity latencies; and vendor independent, in that it can easily support new protocols and content technologies without requiring additional software modules, while being in a position to intercept any request protocol (and related return flow) as well as managing in a unitary manner the requests for authorisation and the accounting events towards a centralised server.

BRIEF DESCRIPTION OF THE DRAWINGS

The invention will now be described, by way of example only, by referring to the enclosed figures of drawing, wherein:

FIG. 18 represents an access content structure adapted for managing a content request and possible redirection thereof within the arrangement described herein.

DETAILED DESCRIPTION OF PREFERRED EMBODIMENTS OF THE INVENTION

Figure 1:
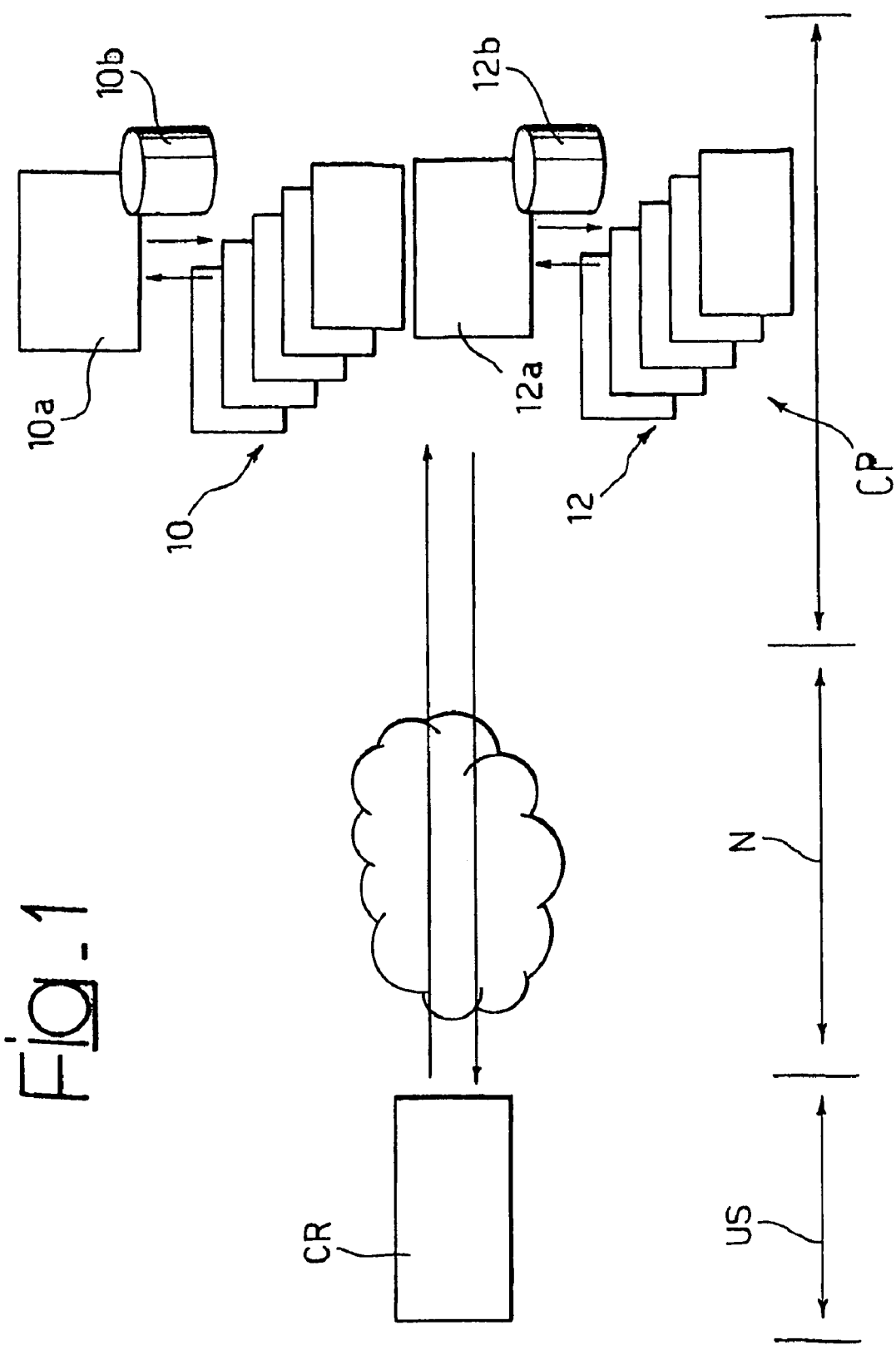
FIGS. 1 and 2 have been already briefly described in the foregoing.
Figure 2:
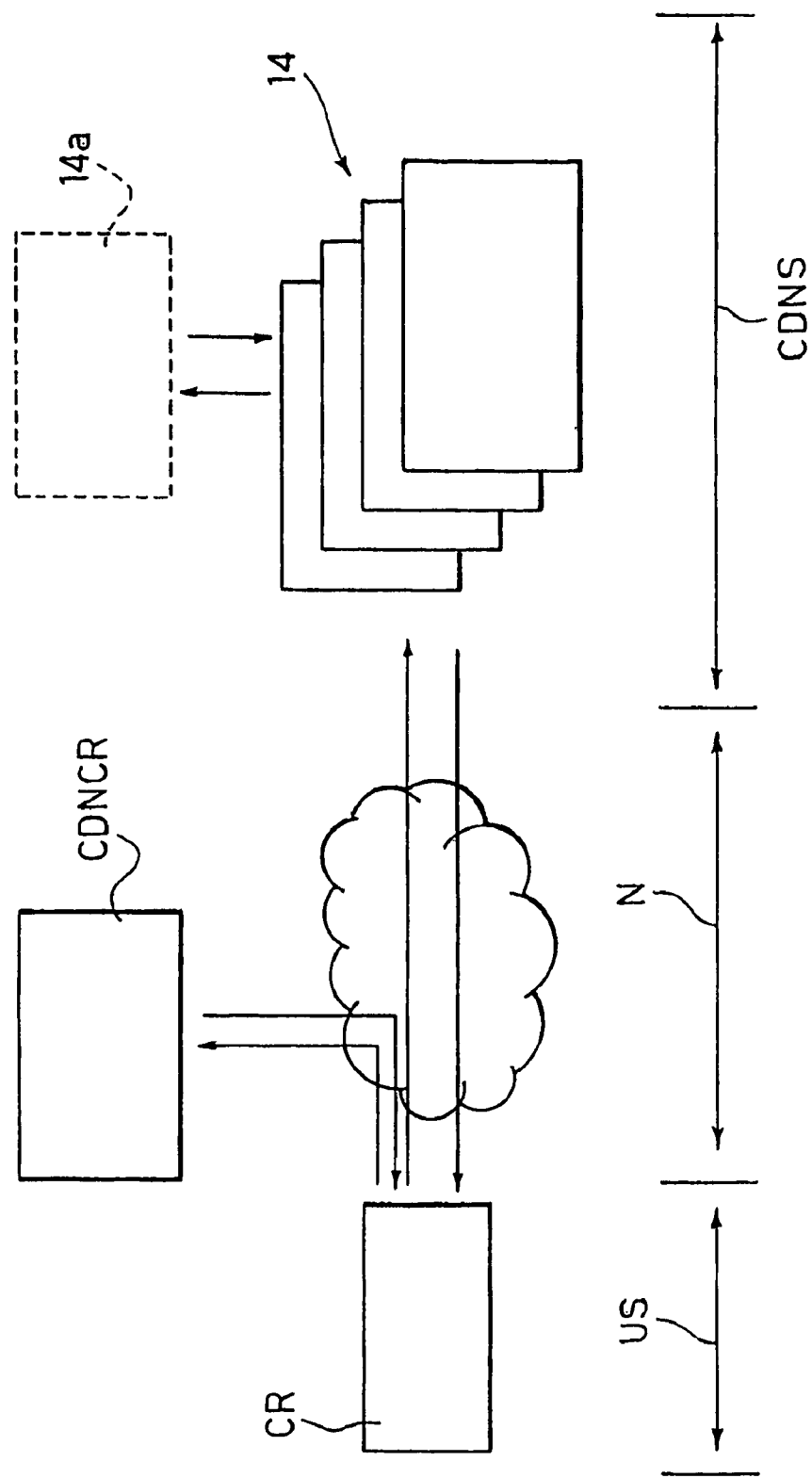
Figure 3:
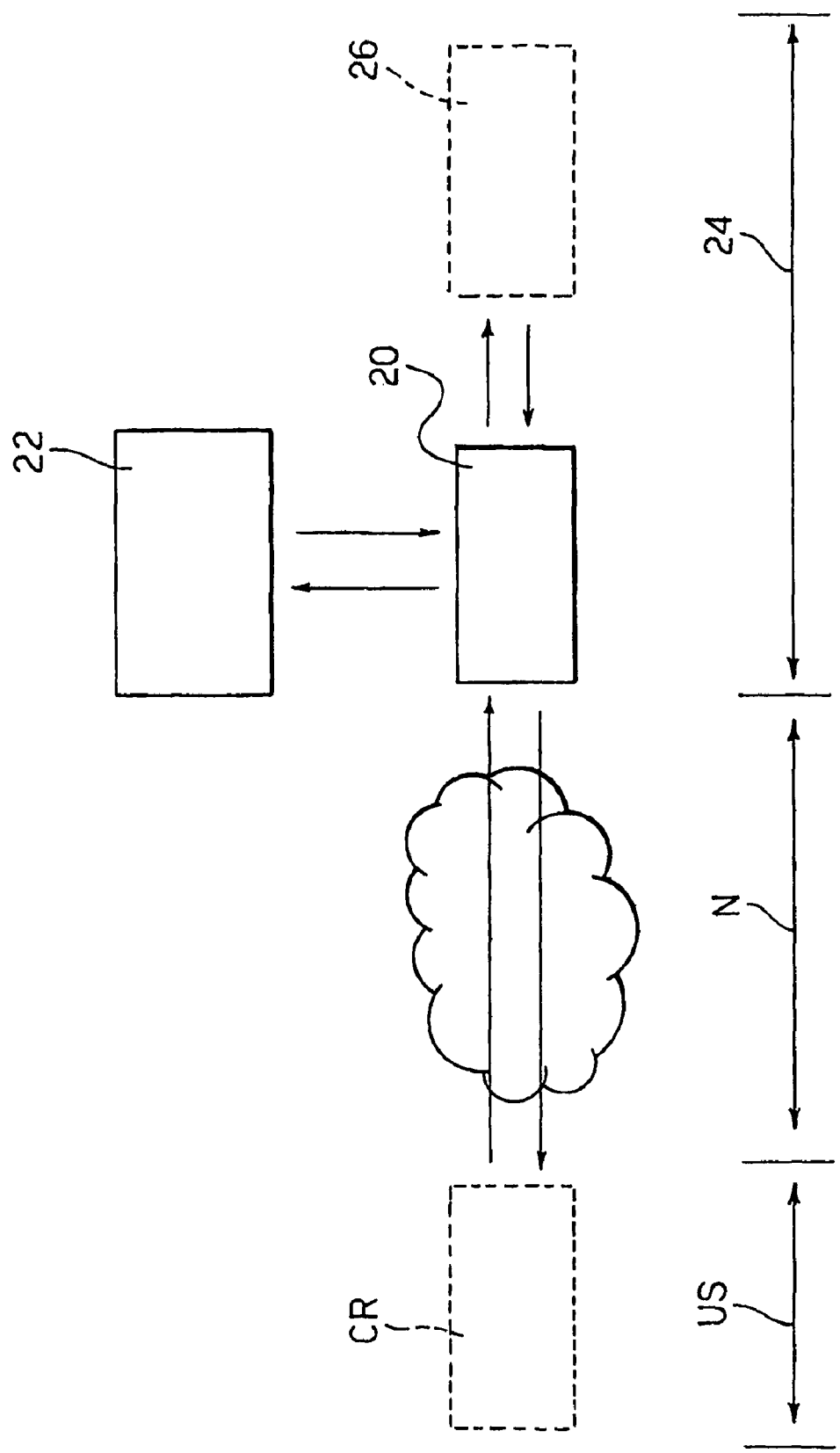
FIG. 3 is a block diagram representing, by using essentially the sane layout of FIGS. 1 and 2, the basic structure of the arrangement described herein, FIGS. 4 to 6 schematically represent the application of the basic layout shown in FIG. 3 to different operating contexts.

FIG. 3 of the annexed drawing shows a possible location of the components of a system as described herein with respect with other objects and elements involved in operation thereof. In general terms, parts, components or elements identical, similar or equivalent to homologous parts, components or elements already described in connection with FIGS. 1 and 2 are designated by the same reference letters and/or numerals.

Specifically, the arrangement of FIG. 3 includes a gateway 20 (hereinafter defined Dynamic Conditional Content Access or DCCA gateway) arranged on the connection path between the content requester CR at the user site US and a content server arrangement 26 (adapted to be configured according to different arrangements, as better detailed in the following) located at the content delivery site 24.

The gateway 20 is configured for performing a number of functions such as triggering, policing, filtering, juggling and reinjecting in respect of the traffic flowing therethrough. The gateway 20 is configured for cooperating with a server 22 playing the role of a content policy and security server. This is positioned at the control level of the network, for instance at a service centre of the telecom operator managing the network. The server 22 has the main task of validating the incoming requests and possibly activating specific accounting mechanisms.

The blocks representative of the contents requester CR and the content server system 26 are represented in dashed lines as they represent pre-existing architectural elements.

Figure 4:
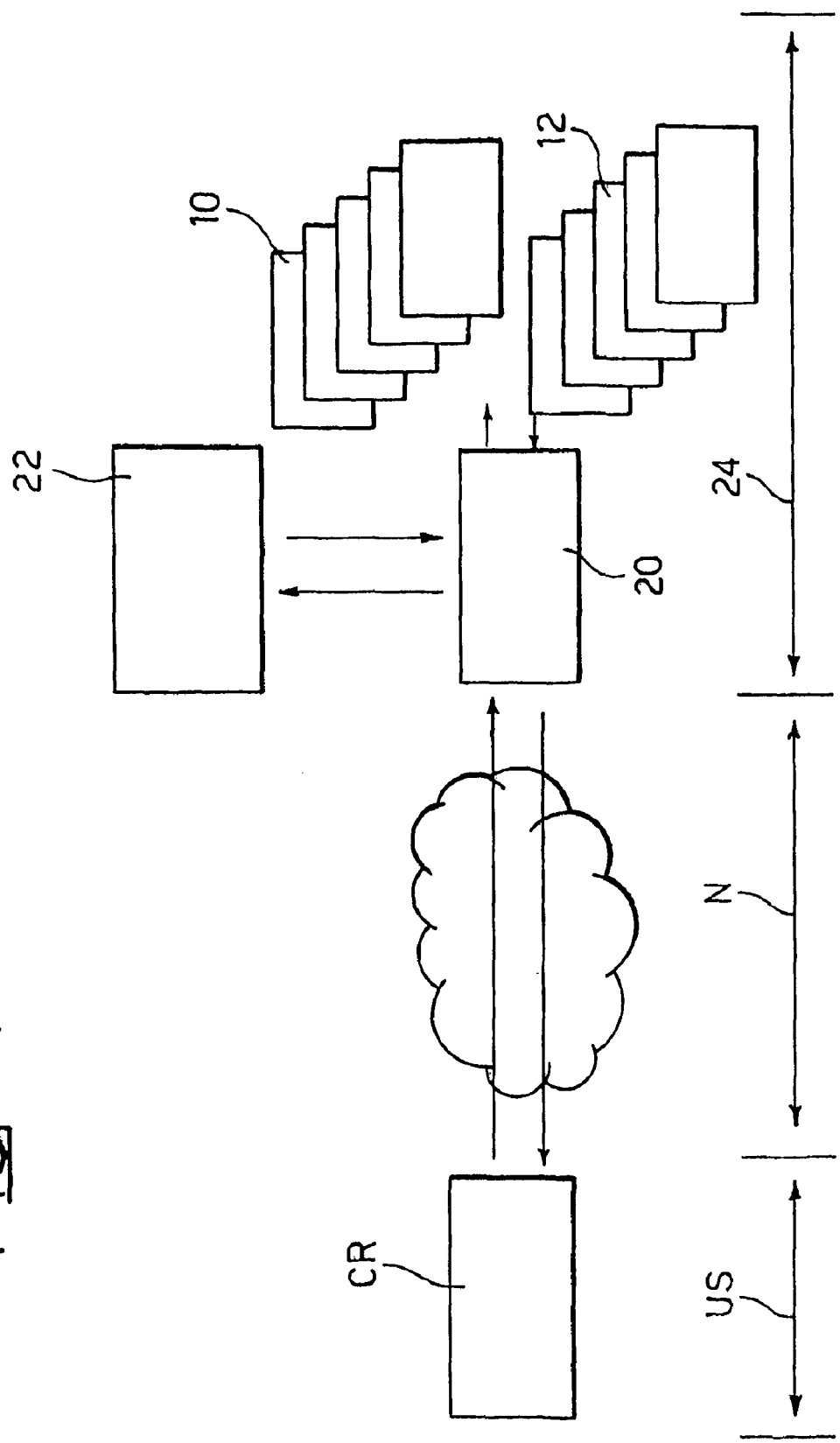
Figure 5:
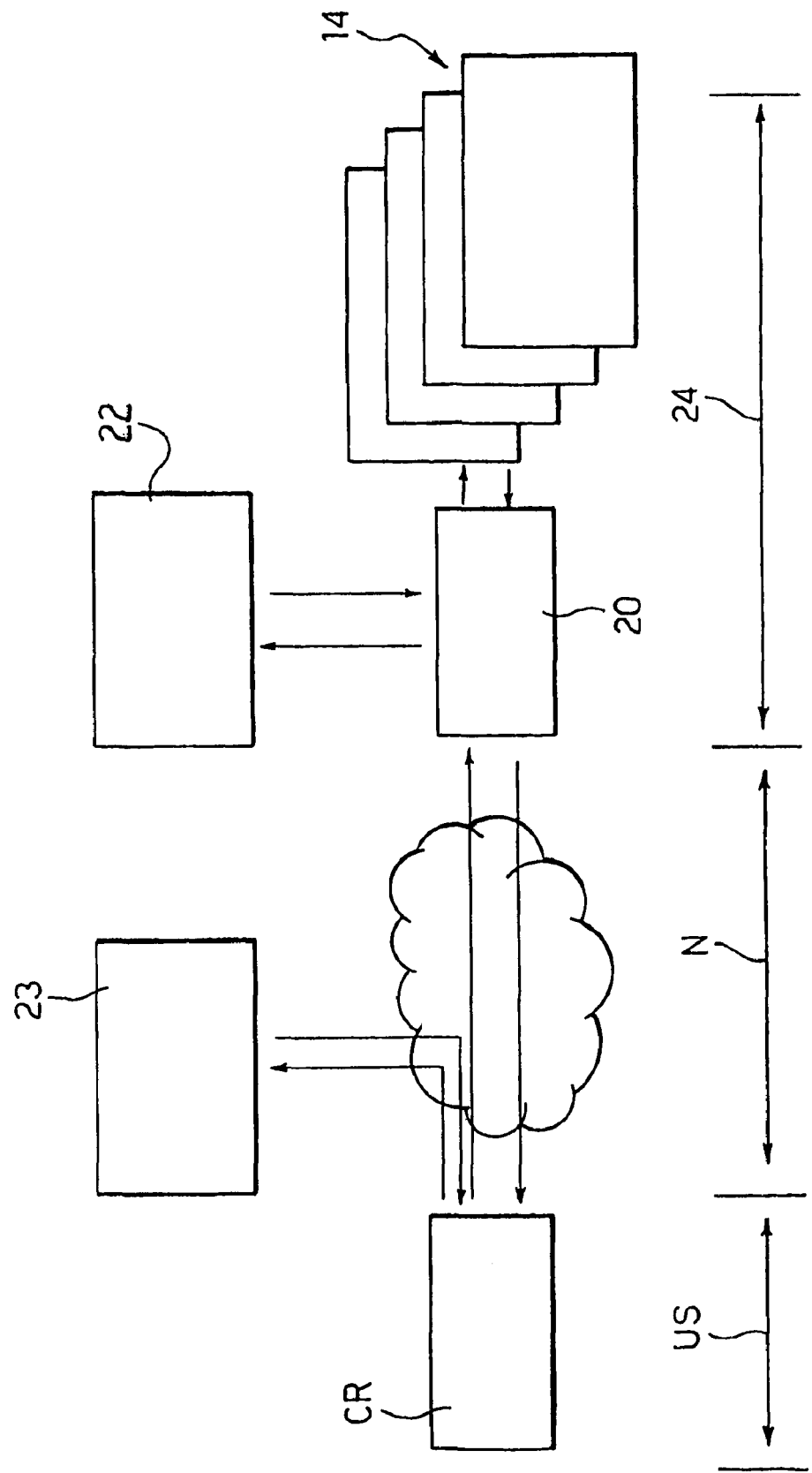
Figure 6:
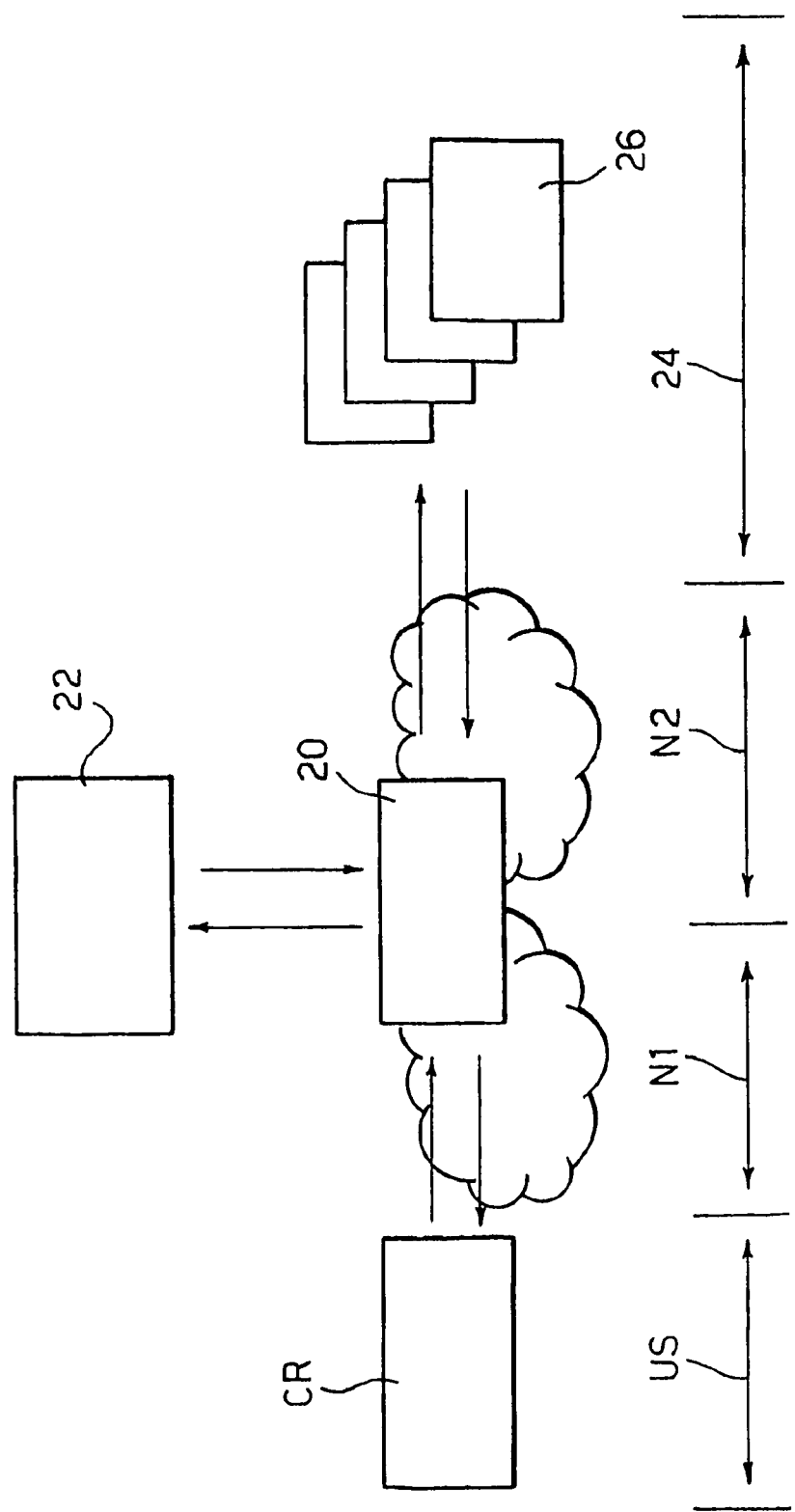

FIGS. 4 to 6 show how the basic elements represented in FIG. 3 may be differently arranged within various architectures adapted for delivering media contents.

Specifically, the arrangement shown in FIG. 4 refers to a centralized architecture wherein the DCCA gateway 20 is arranged "in front of" the batteries/banks of content servers 10, 12 already discussed in connection with FIG. 1.

The gateway 20 and the content policy and security server 22 are two components located in the content provider service centre 24, i.e. the service centre for delivering the contents. In that case, the connectivity element represented by the network N is usually comprised of the access network, (to which the content requester CR and the content provider are 24 connected), the metropolitan network, and the transport network in the case of long-distance connections.

FIG. 5 conversely relates to a CDN-based delivery architecture. In that case the gateway 20 is arranged in front of the surrogate servers 14 provided at each site of the content delivery network (for instance at the metropolitan presence points). Conversely, the content policy and security server 22 is located in the service centre of the operator of the content delivery network, possibly together with the other control components of that network, such as the CDN content router 23.

In that case, the optimal location point for the gateway 20 is, as indicated, in front of the surrogate server (or the battery/bank of surrogate servers) that deliver the contents. Other locations are possible, but these are generally likely to render the control system more vulnerable to users' attempts to operate fraudulently by circumventing the control gateway.

FIG. 6 refers to a "generic" architecture including servers 28 arranged at various locations in the network and coming down to different owners. In that case, the gateway 20 has the task of filtering and controlling all the traffic at the source, namely, in proximity of the access point to the network used by the content requester CR.

The arrangement described herein is in no way limited to the possible use of a CDN enabled architecture or an architecture providing for the use of a service centre. In fact, the arrangement herein is adapted to operate in connection with "mixed" architectures, where the need arises of authorising/ enabling a user to receive a service provided by one or more servers while providing the necessary support for accounting.

The following description of a preferred embodiment of the arrangement described herein will be primarily referred to a possible implementation within a CDN scenario, i.e. to a generic CDN architecture context. In that respect, by referring to FIG. 5, the concept of surrogate server is to be understood in its more general meaning of a "set of" servers providing a contents service, while the content router 23 may be replaced by other systems, for instance a DNS (Domain Name Server) or being absent.

In fact, the basic elements of the arrangements described herein, namely the gateway 20 (which performs the actions of triggering, filtering and redirection) and the content policy and security server 22 (which checks the access rights to the contents in real time conditions upon request by the gateway 20 and providing the result to the gateway 20 itself) are independent of the type of architecture and—more to the point—of the technology used in the content requester CR/content server 24 chain. This means that—any—access to the surrogate server 14 can be intercepted by the gateway 20 and processed by performing the functions considered in the foregoing.

The triggering and filtering mechanisms implemented by the gateway 20 can be configured based on a description and achieve a degree of granularity at the level of a domain name or a single content. This mechanism is implemented by means of list descriptors designated access content lists (ACL) to be described in detail in the following with reference to FIG. 18.

An ACL filter controls by means of permit/deny clauses the following items: the IP source and destination addresses+ subnet mask+VPN ID, the kind of transport protocol (TCP/UDP), the communication port (source/destination) and reference to the content requested.

The ACL filters is kept at the level of the gateway 20, that operates based on interception of the user's request and is activated (in a permit/deny mode) as a result of validation of the enablement performed by the server 22. This is based on sending the user's identifier attributes (for instance the IP address), the content of the service (for instance the URL) and, possibly, of the corresponding attributes of the surrogate server 14 providing the service.

The gateway 20 of FIG. 5 intercepts the user's traffic (request for multimedia contents, which—as a rule—is "technology-dependent"), in a transparent mode, that is without affecting of modifying it. The gateway extracts from each technology-dependent request the contents for which management has been configured, i.e. the IP address of the requester CR, the URL associated with the content requested, the IP address of the surrogate server, and the characteristics of the protocol used.

These data are used to create (as better detailed in the following with reference to FIG. 18) a "technology-independent" access content (ACL) entry, for which validation is requested by accessing the server 22. The server 22 checks the user's credential in respect of the request made and derives a corresponding permit/deny information.

When the user is enabled ("permit"), the data flow from the user to the surrogate server and from the surrogate server to the user remains unchanged.

If the user is not enabled ("deny") to receive the content requested, at least two different interventions may take place.

As a first option, the client's request may be blocked, i.e. the request is not forwarded to the surrogate server 14 providing the service.

As an alternative option, the downstream flow (from the surrogate server to the client) can be blocked.

Figure 7:
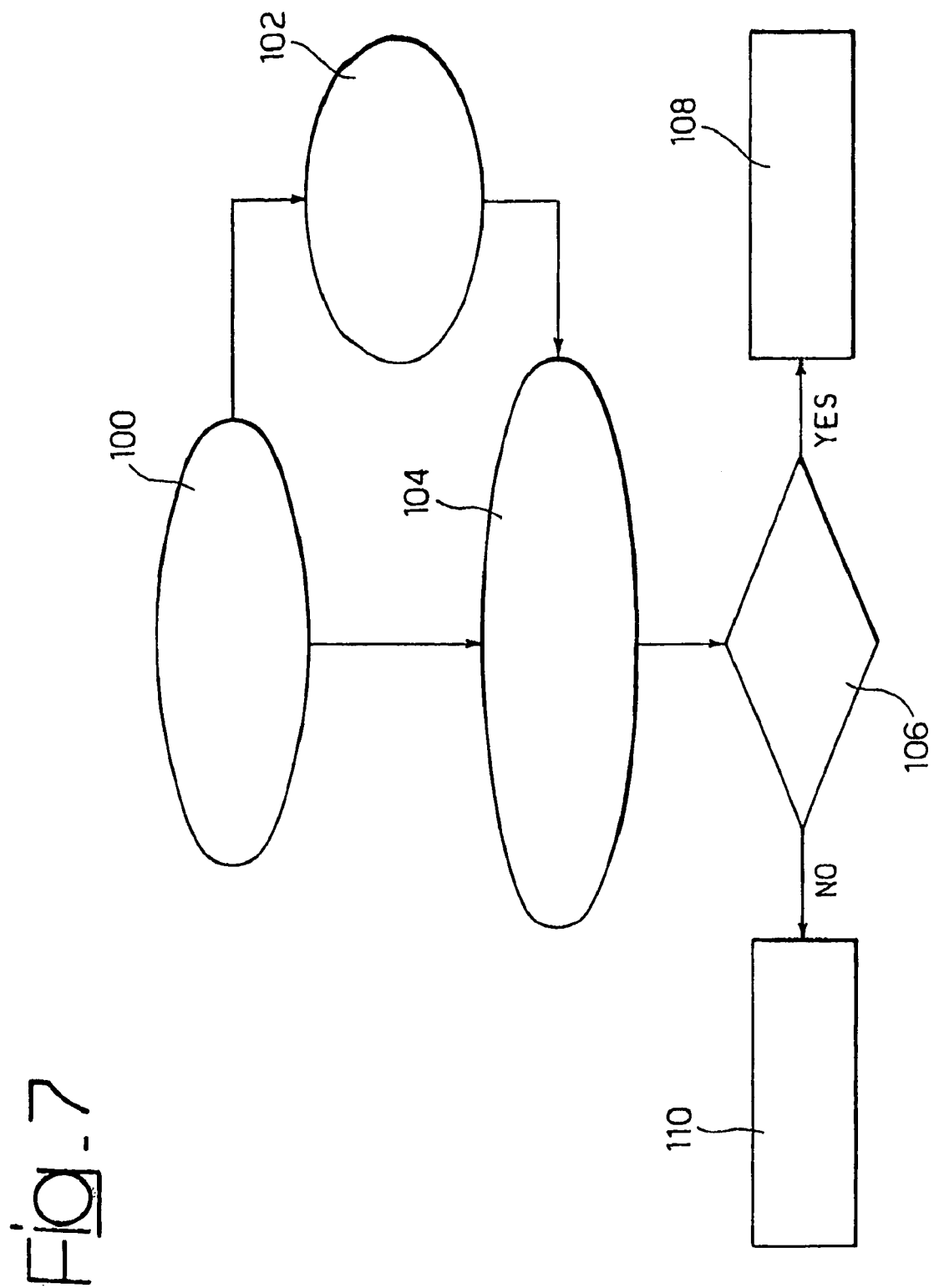
FIG. 7 is a flowchart of some basic control logic adapted to be implemented in the arrangement described herein.

Specifically, by referring the flowchart of FIG. 7, reference 100 designates a step where the gateway 20 extracts from the traffic sent by the content requester CR toward the server 14 (traffic designated 1 in FIG. 8) the IP address (ES) and the URL(s). This data extracted are subject in a step 102 to a check for user capability.

The result of such a check is waited for in a step 104 and a final test is made in a step 106. If the test yields a positive result (user enabled—"permit") the respective request is forwarded to the surrogate server 14 in a step 108.

In the case the check of the step 106 yields a negative result (user not enabled—"deny"), the request is dropped/redirected in a step 110.

Figure 8:
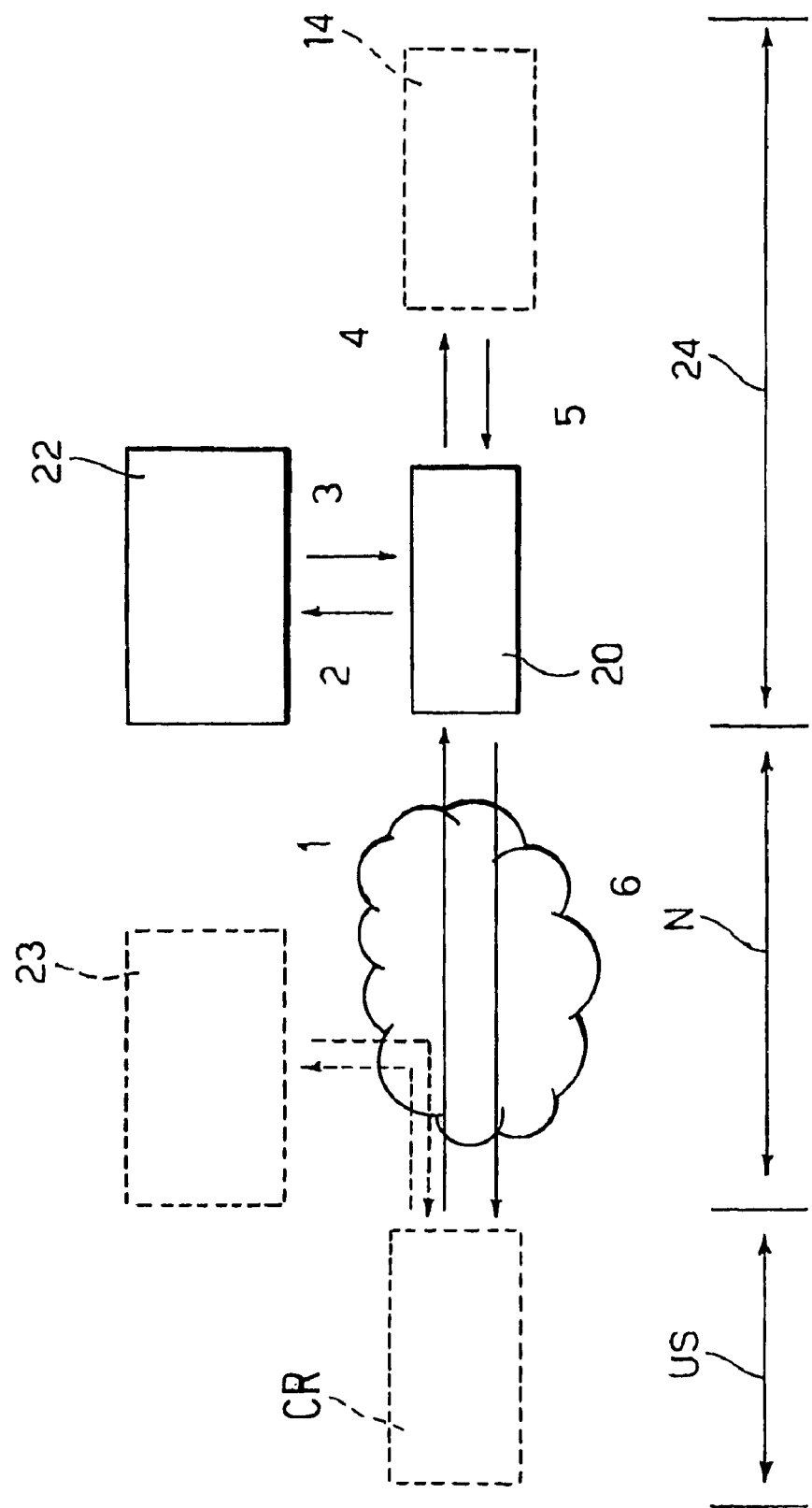
FIG. 8 is a block diagram representative of the data flow corresponding to the flowchart of FIG. 7.

More to the point, the reference numerals 1 to 6 in FIG. 8 identify the time sequence of the various traffic flows. Specifically, that sequence provides for the following steps:

the request from the content requester CR is sent to the gateway 20 (flow 1), the gateway 20 intercepts the request (while the rest of the traffic passes through in an unaltered manner) and places the request in a standby condition without forwarding it towards the surrogate server 14. In the meantime, the gateway 20 prepares a request for the server 22 including the references for the requester (IP address) and the content requested, which is then forwarded to the server 22 (flow 2);

the server 22 performs the check on the user capability with respect to the contents requested and responds to the gateway 20 by means of a permit/deny message (flow 3);

if the result is a positive one, the gateway 20 forwards the original request to the surrogate server 14 (flow 4); otherwise it can dispense with the request or forward it in a modified manner (within the framework of the same TCP session). Additionally, it may set an internal ACL in order to optimised subsequent requests;

the surrogate server responds to the request received (flow 5), and the response flow passes through the gateway 20 toward the content requester (flow 6). This way of operating enables in-line redirection of the contents.

Figure 9:
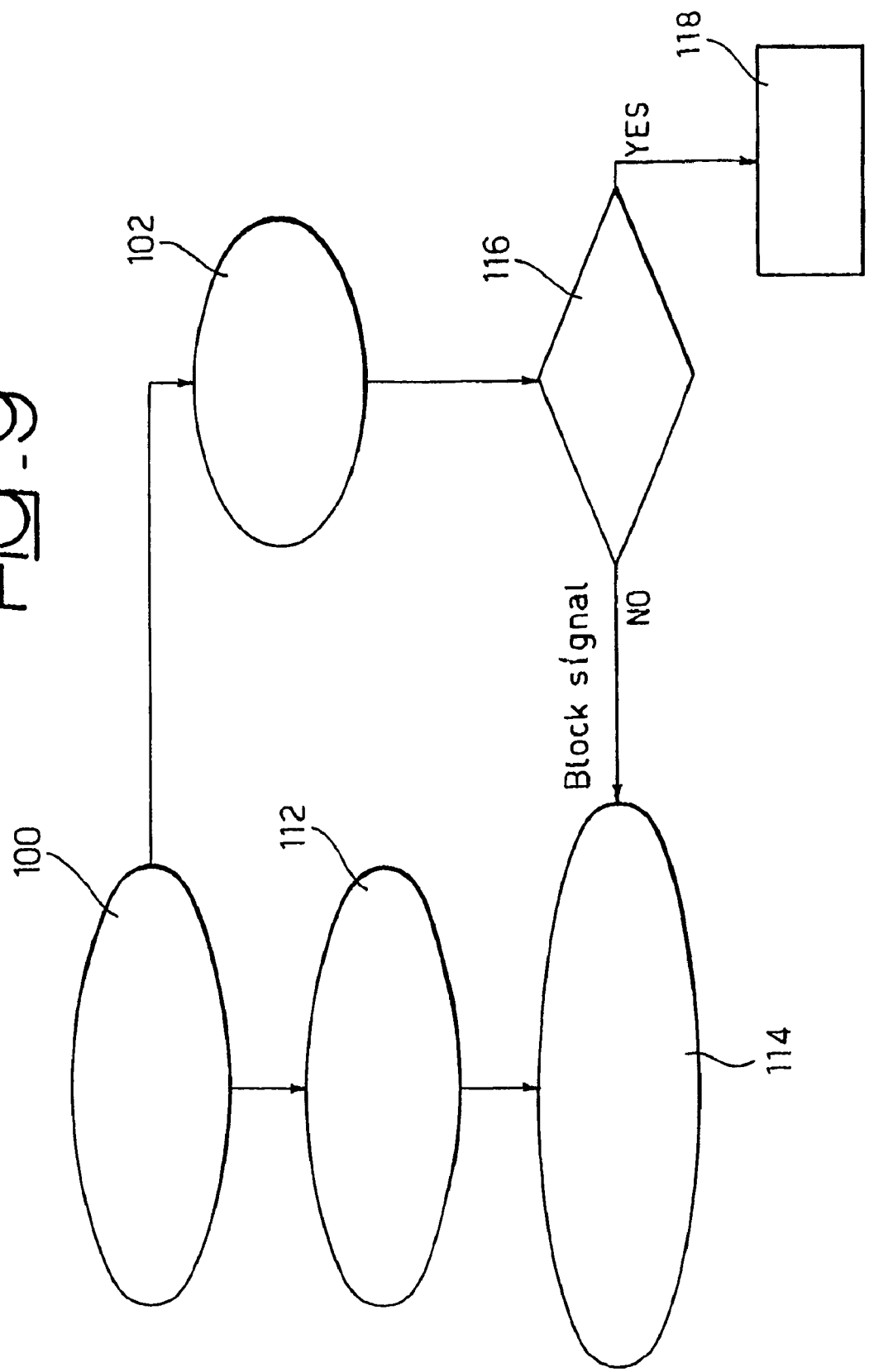
FIG. 9 is another flowchart representing an alternative control logic adapted to be implemented in the arrangement described herein.
Figure 10:
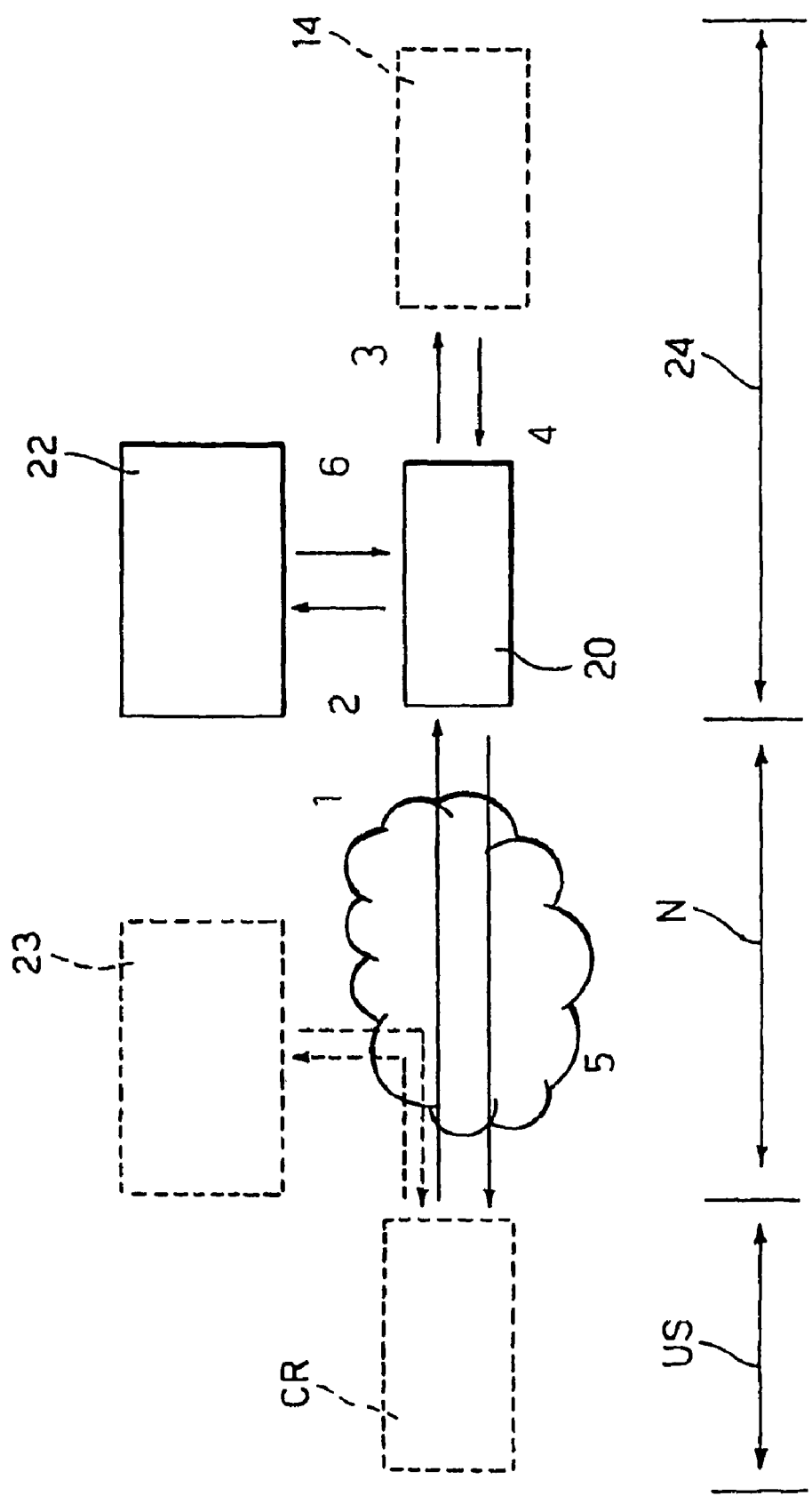
FIG. 10 is a block diagram representative of the data flow corresponding to the flowchart of FIG. 9, FIGS. 11 and 12 are logic block diagrams representative of permission control as implemented within the framework of the arrangement described herein.

FIGS. 9 and 10 describe the alternative approach already considered in the foregoing.

In this case, after extracting (in the step 100) the information concerning the user's capability and passing it on to the server 22 for verification (in a step 102), the alternative arrangement considered in FIGS. 9 and 10 provides for the user request being sent (in a step 112) as a user packet to the server 14 without being in any way altered. In that way, the server 14 may start providing the user with the service requested. This occurs in a step 114 which is continued (at least) as long as the result of the check performed in the step 102 is received from the server 22.

At that point the user's capability is tested in a step 116.

If the step 116 yields a positive result, the system evolves towards "do nothing" step 118, thereby letting the server 14 to continue the step 114 thus delivering the content to the request CR.

If, conversely, the check of the step 116 yields a negative result, a block signal is sent to the server 114 thus interrupting delivery of the service towards the requester CR.

Again, in the diagram of FIG. 10, the various information flows are indicated by reference numerals that identify their time sequence.

Specifically, in the arrangement of the FIG. 10:

the user's request is sent to the gateway 20 (flow 1);

the gateway 20 intercepts the request (while the rest of the traffic passes through in an unaltered manner) and places the request in a standby condition without forwarding it towards the surrogate server 14. In the meantime, the gateway prepares a request for the server 22 including the references for the requester (IP address) and the content requested, which is then forwarded to the server 22 (flow 2);

in the mean time the request is forwarded (unaltered) towards the final destination, that is the server 14 (flow 3), the server 14 starts satisfying the request, by sending back response traffic (flow 4), the response traffic is passed on unaltered from the gateway 20 towards the content requester CR (flow 5);

after checking the user's enablement in respect of the contents requested, the server 22 responds to the gateway 20 via a permit/deny message (flow 6).

In the case of permit, the gateway 20 does not perform any sort of operation; conversely, in the case of deny, it inserts a filter that blocks the response flow from the surrogate server 14 to the contents requester CR (whereby the flows 4 and 5 are discontinued).

The advantage of this alternative arrangement lies in that it permits controlling the user's enablement also in those situations where the transmission latency and the application timeout possibly deriving there from are critical. This may typically be the case of a mobile network.

Figure 11:
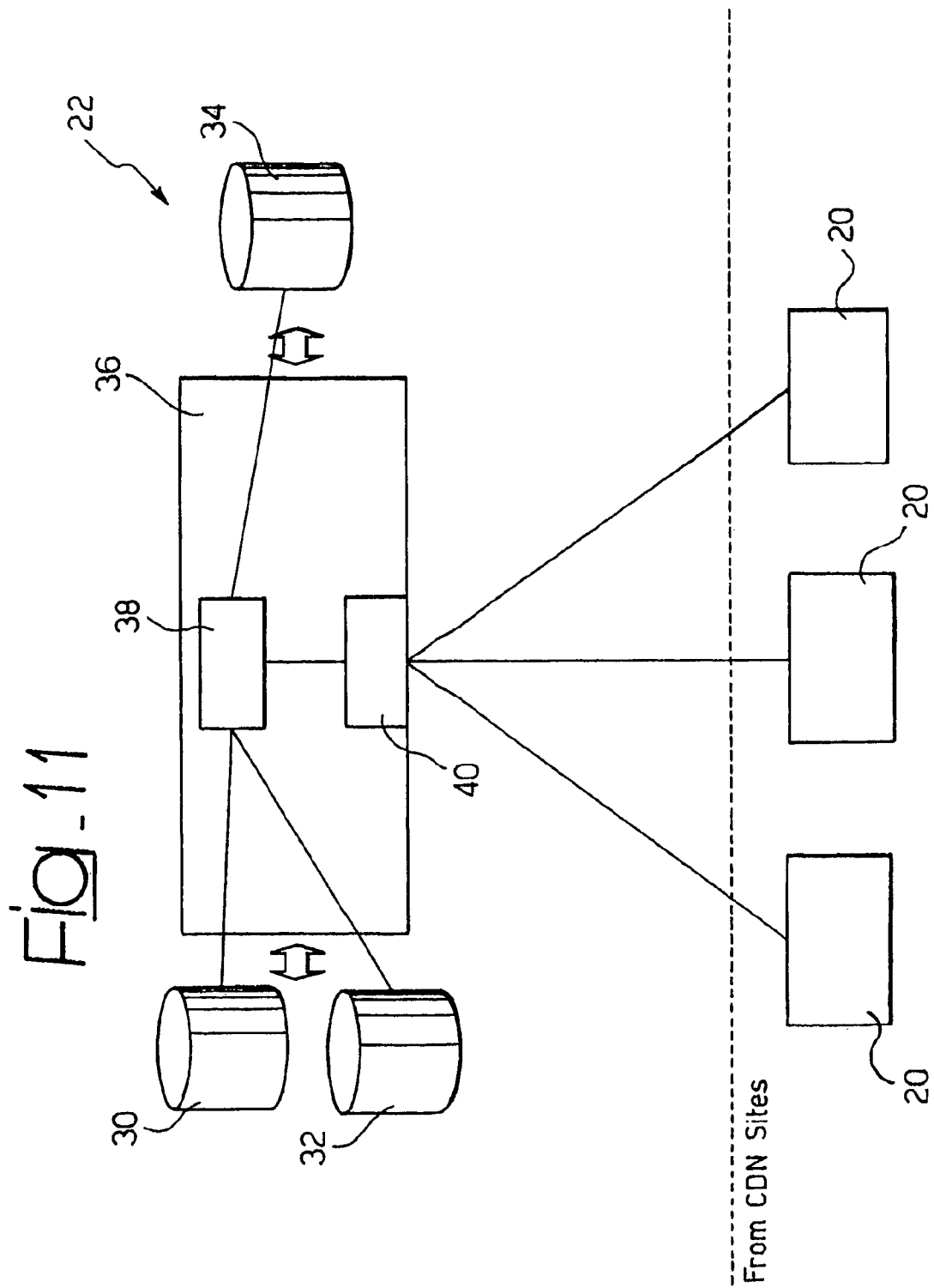

FIG. 11 is an exemplary block diagram of a possible internal structure of the server 22. In the exemplary embodiment shown, the server 22 is essentially a system accessing different databases in order to identify, based on database join operations, the policies to apply for a given user with respect to a given content.

It is of course possible to devise different implementations for this kind of server. Alternative embodiments may be possibly based on servers of the authentication, authorisation, accounting (AAA) type such as those known as a RADIUS, TACACS, TACACS+, DIAMETER or other systems such as LDAP servers, adapted to detect the user profile and decide whether a certain request coming from a gateway can be authorised or not.

In the exemplary embodiment shown, the server 22 includes tree databases, namely:

a user identity database 30 that hosts the information concerning the users (on line or not), a content database 32 that hosts the information concerning the contents available and managed by the system (for instance the respective URL, hosted domain, content provider, cost, duration, and so on), and a content policies database 34 that host the enablement information to the content for the single users (or groups of users).

As shown in FIG. 11, a single server 22 may co-operate with different gateways 20, included in a CDN. As explained in the foregoing, the gateway 20 is configured for detecting the information concerning the requester (such as the IP address), the content requested (such as the respective URL) and possibly the address of the surrogate server toward which the request was directed.

The reference numeral 36 designates as a whole the main logic of the server 22, which include i.e. an ACL checker module 38 as well as a gateway controller 40.

Based on the information items received from the or each gateway 20, the ACL checker module 38 is questioned in order to ascertain the "consistency" of the access to the content with respect to the capability provided for the user.

Consequently, the check module 38 performs the following tasks:

identifying the user based on the respective attributes as passed on from the gateway 20 (for instance by using the IP address to derive from a table the username of the enabled user, which function is currently available on a number of AAA systems); this occurs as a result of accessing the user identity database 30, identifying possible macro-families to which the content requested is related as well as additional pertinent information (for instance the duration or the bandwidth requested), by accessing the content database 32, and verifying the enablements associated with the user with respect to the content aggregations related to the content requested, by accessing the content policies database 34.

The result of such an operation, which may be of the permit type or the deny type, is forwarded from the gateway controller 22 toward the requesting gateway 20.

For instance, in such a case the associate tree databases include:

| User Identity DB 30 | | |
| --- | --- | --- |
| IP Address | UserName | Credit |
| 10.10.10.10 | User1 | 10 Euro |
| 10.10.10.11 | User2 | 1 Euro |
| 10.10.10.12 | User3 | 1 Euro |

| Content DB 32 | | | |
| --- | --- | --- | --- |
| Content Reference | Duration | Cost | Macrofamilies |
| www.milan.it/ultimigoal.rm | 120 | 1 € | sport, soccer |
| www.rai.it/montalbano1.rm | 2500 | 2 € | fiction |
| www.formula1.it/monza.rm | 500 | 1 € | sport, car racing |

| Content Policies DB 34 | |
| --- | --- |
| UserNameKey | Macrofamily |
| User1 | fiction |
| User2 | soccer |
| User3 | sport |

The following request/response pairs may result from/towards the requesting gateway 20

Req(10.10.10.10,www.milan.it/ultimigoal.rm)=>Answ (Deny: content not allowed)

Req(10.10.10.11,www.milan.it/ultimigoal.rm)=>Answ(Permit for 120 seconds)

Req(10.10.10.12,www.milan.it/ultimigoal.rm)=>Answ (Deny, for insufficient credit)

Req(10.10.10.12 www.formula1.it/monza.rm)=>Answ(Permit, for 500 seconds)

Consequently, together with the response, the server 22 may send to the or each gateway 20 some additional information items derived from the databases questioned. These may include e.g. the duration of the content (which becomes the time to live of the ACL itself), residual credit, or other useful information for controlling delivery of the service.

As a rule, it will generally suffice to transmit toward the requesting gateway 20 even just the permit/deny message properly associated with the original request.

Similarly, the step wherein the content aggregations in macrofamilies are checked may be dispensed with if the content policy 34 database hosts policies at the level of the single content (URL) and not at the level of macrofamilies. In that way, a maximum degree of granularity may be achieved in controlling access to the contents.

It will be appreciated that, preferably, the managing function of the active ACLs and the storage thereof are not provided with the server 22 but rather with the respective gateway 20, by implementing just two primitives:

GetACL by the gateway 20, and

SetACL by a server 22.

In other embodiments, it may be helpful to implement a server 22 adapted to store the ACLs created in a centralised manner in order to permit subsequent reset in the case of failure events by the gateway 20. Preferably, in that kind of architecture, an additional primitive is provided of the type:

RealignACL both by the gateway 20 and by the server 22, which takes care of sending from the gateway 20 and towards the server 22 those ACLs available locally (for instance in order to ensure reset after a failure in that component), or vice versa (from the server 22 towards each gateway 20, selectively).

DropACL from the gateway 20 toward the server 22 upon expiration of the time to live of the ACL itself.

Figure 12:
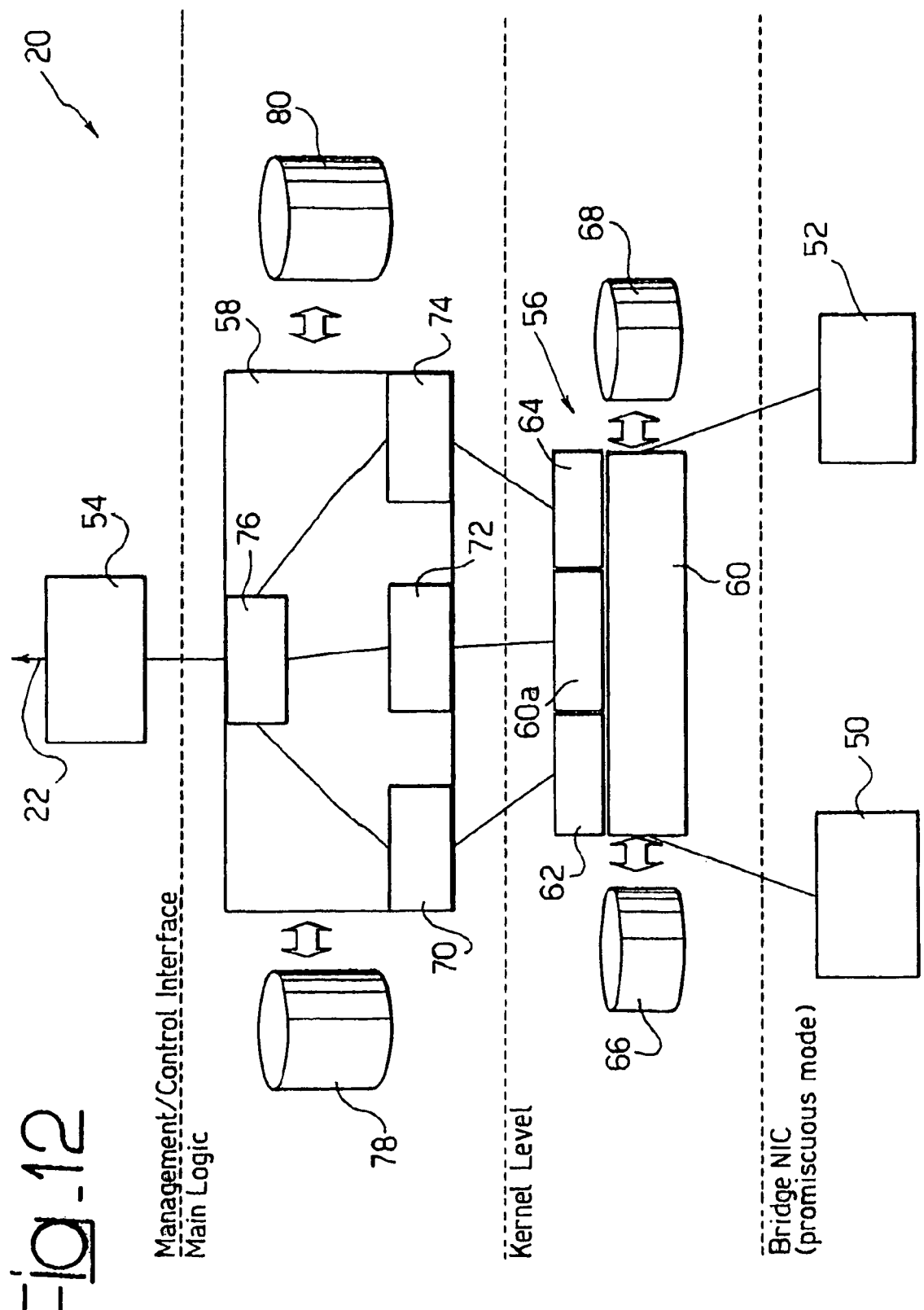

FIG. 12 highlights the internal structure of the gateway 20, while the subsequent FIGS. 13 to 17 are intended to detail operation thereof.

In the exemplary embodiment shown, the gateway 20 is implemented as a separate component. However, having regard to what has been described in the foregoing, and further in view of the rest of this description, it will become evident that the functions performed thereby, namely triggering, filtering, policing and redirection (Juggling+Reinjection) of packets can be implemented in the form of add-on modules associated with other network apparatus such as a network switch, a content switch, a router apparatus or directly with one or more surrogate servers.

The system is arranged over a plurality of layers, two of which (the lowest and the highest) are essentially comprised of network interfaces 50 and 52 cooperating with the content requester CR and the surrogate server, respectively, plus an additional interface 54 towards the server 22.

The intermediate layers essentially include a lower layer 56 at the Kernel level and a higher level 58 at the application contents level.

In the Kernel layer 56 the basic function of a Unix-Like Kernel are provided concerning networking, bridging and filtering at the IP level (up to level 4).

A typical implementation of the layer 56 includes all the typical functions currently located in FreeBSD arrangement as available in the IPFW (IP Firewall) of a FreeBSD arrangement.

Specifically, the following elements are included:

an IP filter module 60 having associated a corresponding control sub-module 60*a* entrusted with the filtering task (up to level 4) of IP packets. This module operates with packets bridged between the two network interfaces highlighted by the lower level, and a Divert sub-module 62 and a Reinject sub-module 64. The module 62 has the task of re-directing Ethernet packets (frames) towards a system application at the user level for processing thereof. The module 64 has the task of re-injecting, always by a system application at the user level, with re-computation of the cyclical correction code (CRC) for correct forwarding toward the network. These modules 62 and 64, that currently are not available for bridged interfaces, can be enabled also for the bridged traffic by correspondingly changing the basic Kernel of FreeBSD.

References 66 and 68 designate two databases hosting static IP rules and dynamic IP rules, respectively.

Using FreeBSD as the basis for this operating system of the gateway 20 has a number of advantages.

First of all, it permits transparent IP firewalling by means of bridging. Additionally, it performs the filtering and triggering actions at the Kernel level with improved performance. The possibility exists of implementing selective divert mechanisms related to the firewalling rules to send specific packets towards one or more Kernel sockets connected to a user-space application.

Additionally, the possibility exists in FreeBSD to perform a packet reinject mechanism by means of the Kernel sockets considered in the foregoing. This permits a user-space application to handle exclusively those packets specifically identified by the firewalling rules by accepting, modifying, rejecting them or handling in a delayed manner the return flow.

Additionally, FreeBSD is a freely available software, whereby the firewalling portion follows the current developments of open source software, while preserving the portion at the application level. The possible changes required in the Kernel networking in order to render the divert/reinject functions available also for the bridged packets can be easily performed.

Finally, the TCP implementations of the BSD are currently regarded as the most robust TCP stack existing in a Unix context.

The main logic module 58 includes a number of application sub-modules. These include an analysis module 70 that performs the (level 7) analysis of those packets received from the Kernel divert module 62 by extracting the IP address and the URL (or, more generally, the references useful for authorisation), while also instantiating the request for authorisation sent to the server 22 (via the interface 54) and handling the corresponding response by enforcing the filtering policy by means of commands sent toward the Kernel control sub-module 60*a*. This essentially involves the presence of a policy controller sub-module 72 and a policy requester sub-module 76. Possible manipulation of the request packet and control of the Kernel reinject sub-module 64 is performed by a packet juggler sub-module 74. Specifically, the policy controller sub-module 72 performs the timing action for the ACLs and possible removal thereof upon expiration of the time to leave set by the server 22.

The main logic layer 58 of the gateway 20 further cooperates with two information repositories 78 and 80.

The former repository, designated 78, essentially includes the configuration settings of the gateway 20. These are essentially inherent to:

static rules for triggering the requests and determining the protocols, the ports and the attributes that are characteristic of the packets over which the content information is scrutinized (as used by the IP filter 60 for level 4 filtering);

parsing rules of the Ethernet framework for locating the IP and URL information intended to be used by the sub-modules 70 for analysis purposes; and possible re-direction rules based on protocol, domain or deny type (for instance insufficient credit, enablement non available, and so on) for possible use by the packet juggler sub-module 74 in order to replace the URL or the original request from the user with an alternative destination. It will be appreciated that such alternative destination is passed on to the surrogate server within the same TCP session. On the one hand, this ensures thereof the existence on the server while on the other hand improving the efficiency of the system itself.

The repository 80 essentially includes the local access content lists (ACLs), intended to describe at level 7 the active filtering at a certain moment and perform mapping with the corresponding rules at level 4 of the IP filter modules 60 stored in the dynamic IP Rules database 68.

Figure 13:
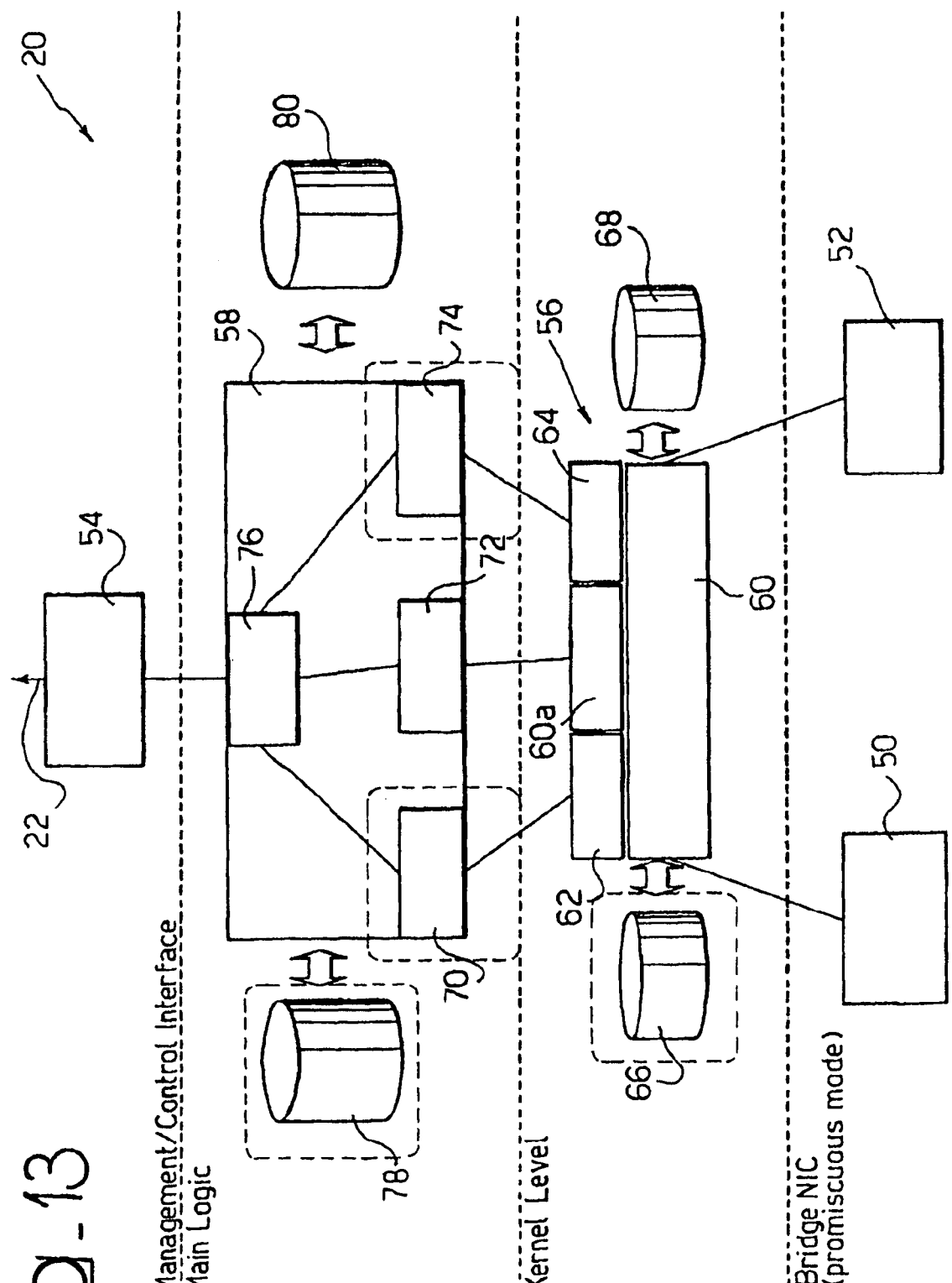
FIGS. 13 to 17 are various block diagrams representing the operation of various modules involved in various operating phases of the arrangement described herein.

The configuration phase of the gateway 20 is better detailed in FIG. 13 where the modules/sub-modules directly involved are highlighted in dashed lines.

Essentially, the main portion of the configuration phase takes place at the gateway 20 before the system is used. In fact, configuration of the server 22 is limited to indicating the references for connection to the gateway(s) and databases used. It will be generally assumed that these are already pre-loaded with the necessary information as previously highlighted.

Essentially, the configuration phase of the gateway 20 involves a number of configuration setting steps.

A first configuration step involves setting the address of the server 22 and the corresponding ports for the information for requesting authorisation (at least a user's IP address and URL) and receiving the corresponding responses (such as deny/permit or timeout). This is essentially symmetrical with the configuration performed on the server 22. Exemplary of this is the following:

```
CP&SSERVER=10.10.15.156
ServerCommPort=22222
NetworkCommPort=33333
```

In a subsequent configuration setting step, involves the definition of the physical interfaces for control and bridging, namely those interfaces by means of which the gateway 20 receives and communicates with the server 22 and the content requester CR as well as the surrogate server.

Exemplary of these are:

```
DCCAControlIf=fxp2
TowardsUserIf=fxp0
TowardsContentIf=fxp1
```

Subsequently, the static filtering/triggering logic at level 4 (static IP rules) is set as intended to be implemented by the IP filter module 60 for the packets between the two bridged interfaces. This includes preferably all the frames of interest for capturing the user's request (and preferably only these frames) for each protocol over which the function is to be implemented. This while also indicating the divert port at the Kernel level where the modules 70 (L7 analysis) and 74 (packet juggler) may receive and re-inject packets on the bridge between the content requester CR and the surrogate server. Such settings may also include those settings related to blocking the current responses for the protocol. For instance, in the case of the Real protocol of RealNetworks this configuration may include:

TriggerL4DivertRule=divert 11111 tcp from any to any 554,7070,7071 in via fxp1 established InitL4FilterRule=deny udp from any to any 6979-7170 in via fxp0

Subsequently, the level 7 analyse logic is set in order to extract the reference to the content to be sent for authorisation purposes to the server 22. This occurs by highlighting the prefix pattern to search in the frame (without taking into account the character coding adopted), arranged before the string reporting on the contents. In the case of Real this may take the form:

TriggerL7PrefixString="PLAY rtsp://"

Subsequently, the packet juggling logic for packet accept/deny purposes is set for each protocol managed in a possibly different manner for each hosted domain. It will be appreciated that in this case, for the protocols indicated, the gateway 20 will adopt a filtering logic of the active type on the request as indicated in FIGS. 7 and 8. In the case of Real this may be:

```
ReinjectAccept=<none>
ReinjectDeny=sorry.rm (per hosted domain =
"rai.cdn.telecomitalia.it"
ReinjectDeny = please_subscribe.rm (per hosted
domain = "cnn.cdn.telecomitalia.it")
```

As an alternative to the rule previously indicated, the rule template at the level 4 is set to be automatically inserted in the case of accept or deny is set for managing the delayed active filtering action on the response. Quite often, these rules are simply in the form of the negation of a rule set as InitL4FilterRule, adequately instantiated between the IP address of the content requester CR and the IP address of the surrogate server indicated in the request. If the template is different a useful definition may be:

TemplateAcceptRule=accept udp 6979-7170 which in the case of accept produces the insertion (by the policy controller module 72) of a level 4 rule to be managed by the IP filter 60 of the type:

```
accept udp from <Surrogate Server> to <Content
Requester> 6970-7170 in via <TowardsContentIf>
and similarly for the deny
TemplateDenyRule=deny udp 6970-7170
```

In the configuration examples made herein this may turn out to be superfluous as it falls within the static rules of the database 66.

Figure 14:
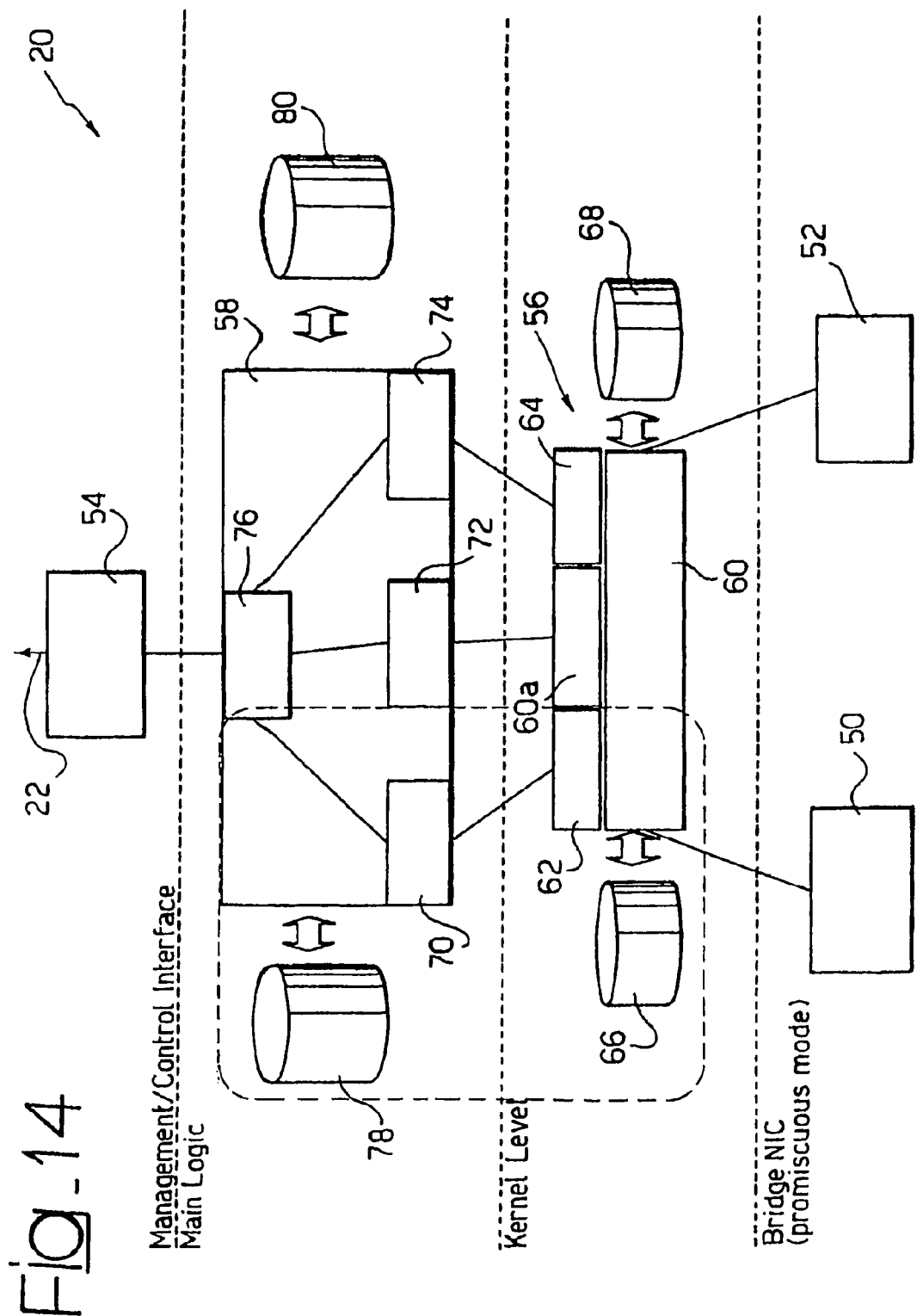
Figure 15:
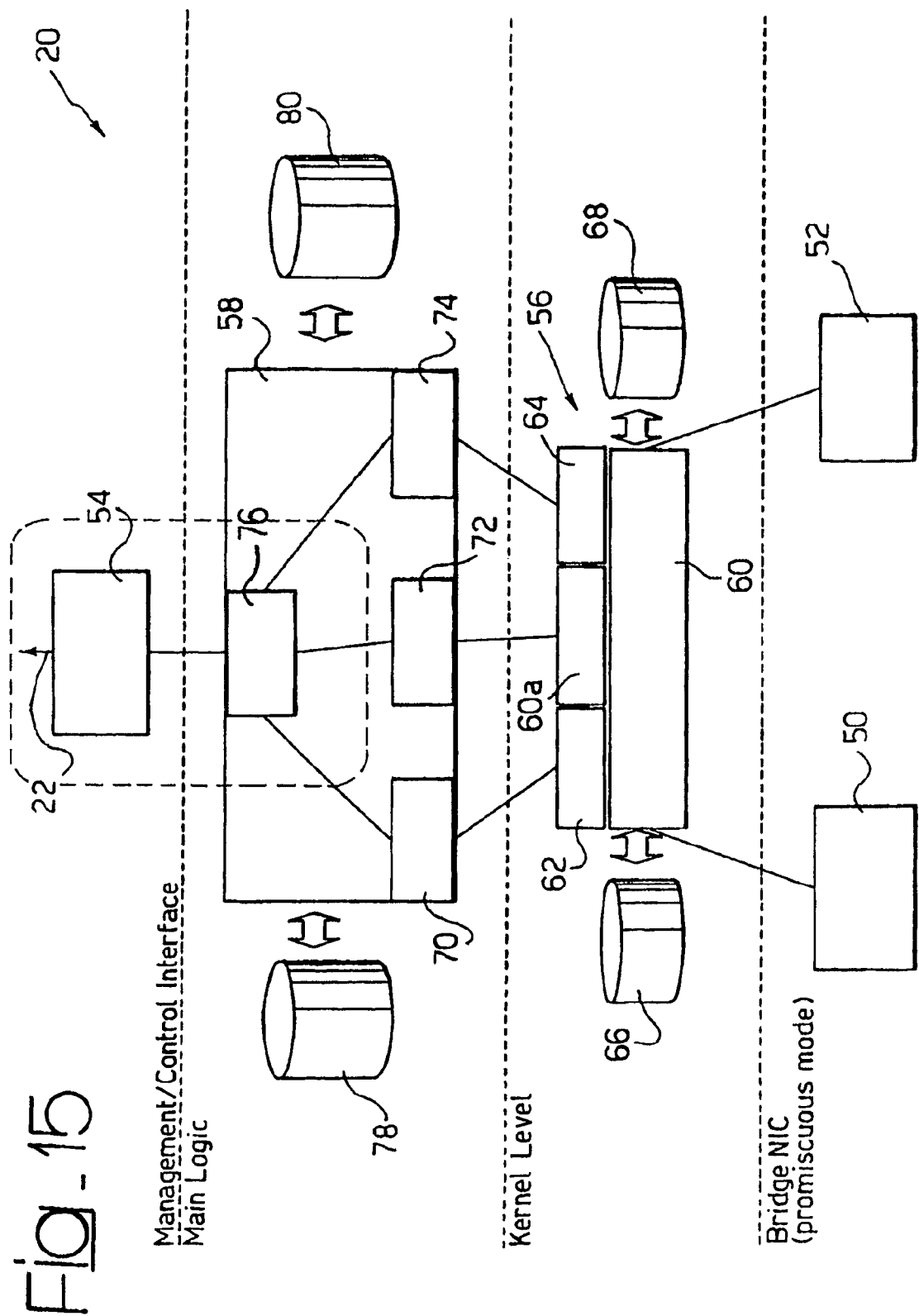
Figure 16:
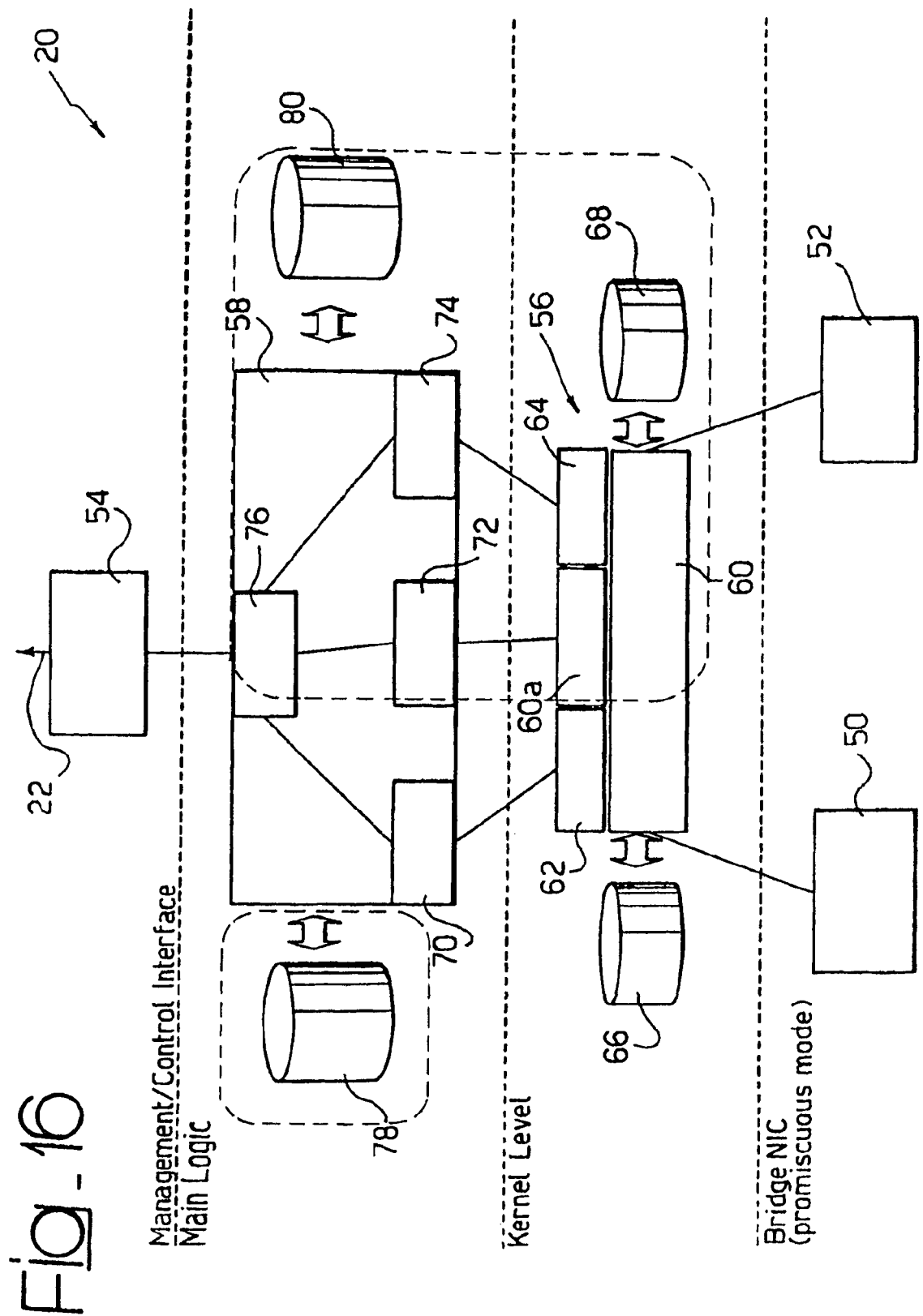

FIGS. 14 to 16 highlight the components of the gateway 20 that come into play during various operating phases of the gateway 20.

Specifically, FIG. 14 highlights the components of the gateway 20 that perform the triggering action of the request.

First of all, by means of the rules contained in the database 66, the ("technology-dependent") frame coming from the content requester CR is analysed at level 4 by the IP filter module 60. If that is of interest, instead of being directly forwarded (by the IP filter 60) towards the interface 52 to the surrogate server, the frame is intercepted and sent via the sub-module 62 towards the analysis module 70 at the application level.

By using the parsing rules for the packet contained in the database 78 (specifically as regards to protocol prefix) the analysis module 70 sends toward the policy requester 76 the set including:
    <the identifier attributes of the Content Requester>
    <the identifier attributes of the Content Requested>
    <the identifier attributes of the Surrogate Server>

This set may in fact be limited to the user's IP address and the URL as well the IP address of the surrogate server.

It will be appreciated that in that way a unitary authorisation mechanism is performed which is "technology-independent", i.e. totally independent of the content distribution technology used in the network.

The diagram of FIG. 15 highlights the component of the gateway 20 that implement communication toward the server 22. This activity is completely managed by the policy requester module 76 which performs the tasks of:

packetising the request by using the data contained in the analysis module 70, and sending the request by using the communication port 52 toward the server.

Simultaneously, the module 76 manages the responses coming from the server. These responses (typically in the form of accept/deny messages possibly having associated some additional characteristics related to the content such as duration, requested bandwidth and so on) are forwarded toward the application modules. These modules manage the creation of dynamic filtering policies (via the policy controller module 72) and the packet handling (via the packet juggler module 74).

In the absence of a response from the server 22 within a certain time-out period, the policy requester module 76 enforces default policies set by the administrator, such as those aiming at avoiding delivery of the content.

A subsequent filtering phase causes the information to be passed or not to be passed from the content requester CR to the surrogate server and vice versa. For that reason the elements highlighted in FIG. 16 (once again highlighting is by means of dashed lines) give rise to an internal support structure, contained in the database 80 currently designated access content list (ACL). This structure describes the permit/deny clauses active for a given user and a given content and other attribute useful for level 7 filtering. These clauses additional refer to a level 4 clause managed by the IP filter module 60 and the related sub-modules.

FIG. 18 describes the possible tracing for memorizing the access content lists ACLs within the gateway 20. Such a structure may also be used within the server 22 for centralizing storing of the existing ACLs.

As described in the foregoing, an ACL list defines parameters for a connection/request. Based thereon rules can be defined for accepting or denying access to certain network resources.

FIG. 18 is exemplary of information fields used for implementing the decision logic (filtering logic) within the gateway 20. In the exemplary case shown in FIG. 18, the fields indicated have the following meaning/function:

Action: describes the action to be performed in the presence of certain connection parameters (accept/deny);

Src IP and Dst IP: these represent the IP address of the entities that establish the connection and include, if necessary, information concerning the ID of the corresponding Virtual Private Network (VPN) and subnet mask;

Protocol: identifies the type of transport protocol used for connection (TCP/UDP);

IN Port and OUT Port: these define the logic ports used for communication between the processes establishing connection;

H.D.: represents the Hosted Domain on which the content was requested (for instance cdn.telecomitalia.it)

Content: identifies the URL of the single content requested as a result of the connection (for instance: /recent/promo.asf);

TTL: defines the validity time of the ACL clause, beyond which such a clause will be automatically removed.

FIG. 16 highlights the components used by the gateway 20 to permit control of the request by setting a delayed filter acting on the response as presented in FIGS. 9 and 10.

In that case, the packet juggler module 74 forwards the request packet towards the output interface 52 without any modification. In order to do so, it is immediately activated by the policy requester module 76 before forwarding the request toward the surrogate server.

Most of the activity is performed by the policy controller module 72. This module receives the information required by the policy requester module 76 based on the criteria established at the configuration level for a given protocol by interacting with the IP filter control module 60. The policy controller module 72 has the task of maintaining/overhauling the ACLs contained in the database 80, especially as regards to the managing function of the TTL values for the rules.

Figure 17:
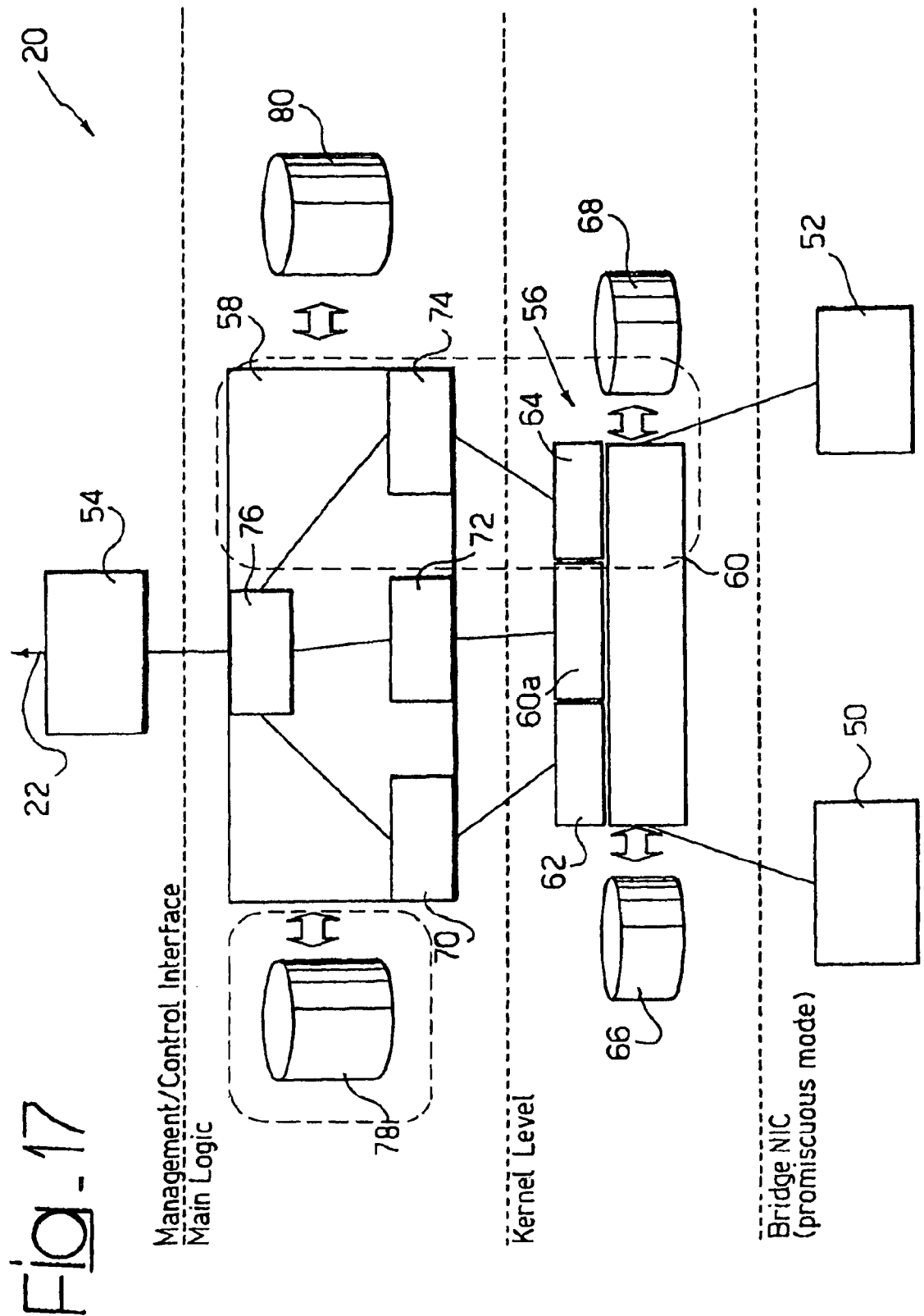

FIG. 17 highlights the components of the gateway 20 that come into play during the phase where a modified request is re-injected. Ad described in the foregoing this corresponds to the alternative solution considered in FIGS. 7 and 8.

The two options can be configured for a single protocol and allow different features to be obtained depending on the operator's needs. Two basic factors in that respect are represented by a lower/higher sensitivity to the delays in the response by the server and the application timeout, or the lower/higher personalization of handling the denials of the request.

In this latter case, the packet juggler module 74 performs most of the related activity. Depending on the response (accept/deny) received from the policy requester 76, the packet juggler module 74 determines if and how the original request packet (still at "standby") is to be re-injected at the kernel level in order to be forwarded towards the surrogate server.

In that case, the creation of a local ACL leads to optimising any subsequent request of the same type, by creating a sort of cache thereby avoiding continuous server queries.

A basic advantage of this arrangement lies in that it permits in-line redirection of the packet towards so-called "sorry destinations" (these are usually in the form of html pages, movies or other, depending on the type of request), while maintaining the TCP connection with the surrogate server active and without requiring the presence of an emulation software module for each technology intended to be managed.

Practical embodiments of the gateway 20 concentrate on a system where the triggering action, and the ensuing filtering action, are performed with a high degree of granularity, notionally in connection with each and every content requested by a specific user.

In that respect, both i) arrangements that behave as proxies for the content services and ii) arrangements that perform filtering at the bridging level have been considered by evaluating their characteristics in terms of transparency in respect of the impact of the agent—or the component playing the role of the agent—on the network (so-called "transparent" firewalling).

As a further extension, the triggering and filtering components can be considered separately in order to extend the analysis also to those packet analysis and packet inspection systems existing in web filtering systems that are sufficiently configurable and granular.

Finally, various possible modes of packet mangling/reinjection are considered.

A first observation is that FreeBSD and Linux give the possibility of filtering IP packets up to level 4, re-directing them on a Kernel socket while also permitting management at the application level. This capability is exploited by many network analysis systems. Additionally, FreeBSD gives the possibility of forwarding IP packets that satisfy a given firewalling rule toward a user application that may decide whether these packets are to be modified or re-injected into the network (divert rule). In that case, the system takes care of reassembling the Ethernet frames in a correct manner.

Additionally, both FreeBDS and Linux offer the possibility of configuring a pair of network interfaces in a bridged mode. This arrangement, however, no longer offer the possibility of diverting the packets.

Packet analysis does not request by necessity the availability of an application layer proxy. Analysis can be performed via the analysis mechanisms of the regular expressions (so-called "monkey analysis"), as typically used by intrusion detection systems. Certain intrusion detection systems provide a triggering mechanism if a pre-defined signature is detected in parifying the Ethernet packet.

Other systems use the signature mechanism to perform an intelligent shaping of the packets, by operating at level 7.

Figure 19:
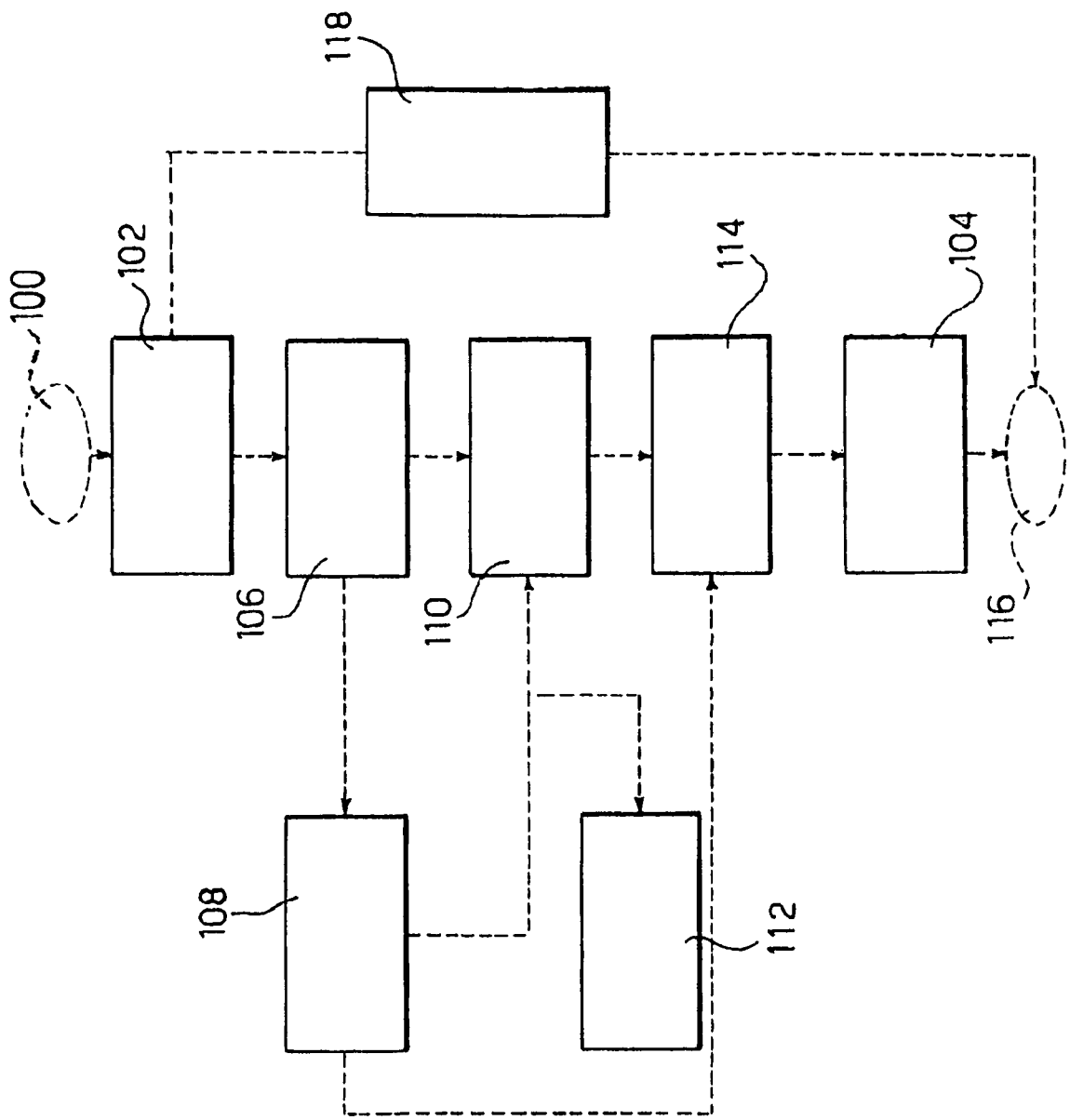
FIGS. 19 and 20 are exemplary of possible practical embodiments of the arrangement described herein.

The block diagram of FIG. 19 highlights the various phases of operation of the arrangement described herein without expressly referring to the positioning of the modules within the various devices.

In a step 100 a generic packet enters the DCCA gateway 20.

In a step 102 level 4 analysis (for instance direction, protocol and ports) detects certain packets to be re-directed (diverted) towards level 7 analysis. Those packets that are not filtered by the level 4 rule follow (after some possible controls based on other level 4 rules for other protocols in block 102), a typical bridge flow through block 118 in an unaltered manner.

Level 7 analysis is represented by a block 106.

In the exemplary embodiment described herein this analyse is performed in user land and not at the kernel level. In any case, such analysis determines the characteristics of the request and forwards the authorisation request to the authorisation module (block 108). In the exemplary embodiment described herein this is implemented by the server 22. In any case, level 7 analysis may require the temporary authorisation of the request (in the case of the operation mode based on delayed authorisation with response control). In that case, the device may set a rule based upon time.

The rule setting phase is represented by a block 110. This usually involves activating rules for enabling traffic in two directions and, generally, other related rules that permit accounting management on the response traffic (this is usually performed by an external module designated 112).

The authorisation phase as performed in the module 108 may give rise (for instance, as a result of a deny response) to in-line redirection of the request by acting on the redirection phase (block 114).

Subsequently, the re-inject phase 104 reinserts the packet previously subject to a divert action (as possibly modified as result of redirection). Finally, in a step designated 116 the packet (either bridged or reinjected) exits the device.

Figure 20:
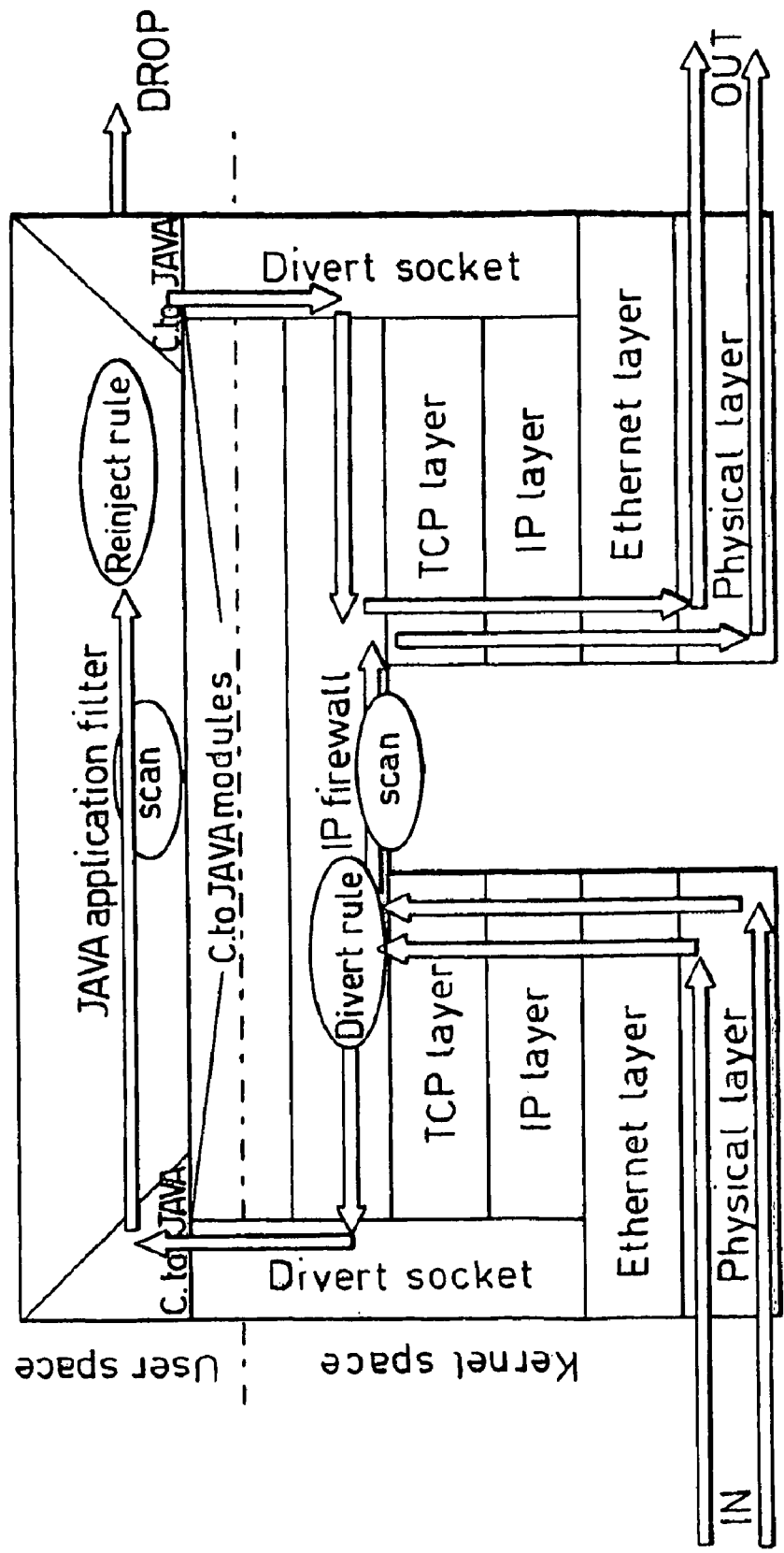

FIG. 20 shows the incoming network traffic (request for multimedia content), intercepted and filtered at the Kernel level (by means of IP firewall rules) and brought to a user space. There, JAVA modules take care of the task of authorising requests and re-injecting the traffic at the kernel level for serving the request in a tradition manner.

As indicated, a preferred location of the gateway 20 is in front of the server. In that way, the server can be controlled by ensuring that the network path for reaching it, starting from any client considered, is—by necessity—just one, passing through the device.

Otherwise, a FreeBSD 4.8 kernel can be modified in order to ensure that some sub-components of the ipfw command (related to divert and reinjection of the packets toward and from the application level) may operate correctly also with the bridged packets.

The requests by the end users are intercepted at the input network interface and passed, through the network protocol stack, to the kernel module (IP firewall) for packet filtering. Such a module analysis and filters the network traffic by setting rules of the type:

0400 accept from 192.168.0.1 22222 to 192.168.0.2 33333 tcp in via fxp0 established.

There, the first parameter represents the identifier for the IPFirewall rule, the second the action to be performed (allow/deny/divert), followed by the source and destination IP addresses and the respective logic ports, the transport protocol, the input interface for the traffic, and, in the case considered, (TCP protocol) the control of the SYN flag for controlling whether the connection is set up or not.

The IP firewall offers an additional function that permits sending traffic satisfying the conditions of the rule towards the user space by using a specific socket (DIVERT_SOCKET). In that way, any processing tasks related to network traffic can be displaced to the application level.

For that purpose, it is sufficient to indicate the option "divert" as the action field in the IP firewall rule:

0400 divert 44444 from 192.168.0.1 22222 to 192.168.0.2 33333 tcp in via fxp0 established This by also indicating also the logic port of the divert-socket (44444) toward which the network traffic satisfying the rule must be sent.

A module developed in C (C_to_JAVA) ensures proper interfacing of the divert_sockets with the JAVA applications for analysing and processing the request from the kernel level.

For instance, such an arrangement can be applied to ICMP traffic (of the echo request type) by using, as the IP firewall rule for interception:

0400 divert 44444 from 192.168.2.2 to 192.16B 0.2.1 icmp in via fxp1 icmptype 8.

This has the purpose of intercepting the ICMP requests from the client at the "fxp1" interface, by passing such packets to a JAVA software module listening on the "44444" port for video output of the data packets and re-injecting the traffic on the output interface (fxp0).

The filter is thus transparent to the requester client, while correctly intercepting (and possibly printing) the ICMP packets on a standard output.

Alternative experiments were carried out by using the "mmst" protocol (mmst over TCP transport) by using as the IP firewall RULE:

0400 divert 44444 from 192.168.2.2 to 192.168.2.1 tcp in via fxp 1 established.

This has the purpose of intercepting all the data packets requesting multimedia contents from the Windows Media™ server (TCP sessions set: SYN=0), passing them on to a JAVA software module in user-space for video output and re-injection into the traffic at the output interface (fxp0).

The audio/video stream was left unaltered during the interception and re-injection process. During operation, it is possible to visualize the URLs contained within the requests from the server. By communicating with the security server, the JAVA module in the agent checks whether the IP address that has requested a given content is enabled for receiving the content of the requested URL.

In that case, the traffic diverted toward a user space is re-injected at the kernel level by using the divert_sockets and the request is subsequently forwarded via the output interface to the pertaining storage apparatus.

In the case where the test performed by the JAVA module yields a negative result, two possibilities exist:
  the traffic is discarded or re-directed toward a sorry page (positive logic),
  otherwise the traffic is re-injected at the kernel level and permitted to reach the storage devices while the response flow from the caches is subsequently blocked (negative logic).

Re-directing the network traffic from the kernel space to the user space via the divert_sockets is made possible by modifying the kernel module related to the IP firewall. This originally performs a control on the consistency of the IP packets before the divert operation (which therefore is not allowed on non-IP packets). The modification removes that kind of control, thus giving the possibility of performing a divert action on "pure" ethernet frames.

The arrangement described herein authorises requests by exploiting a PULL paradigm: the user advances the request; this is either intercepted directly or the associated return flow is intercepted, and control lists on a network system are finally generated.

Additionally, the mechanism intercepts the request or the return flow identifies a start-accounting event, namely the beginning of delivery. Subsequently, the automatic generation of the entry in the control list leads the system in the network to monitor the activity by possibly generating other types of usage record (interim and stop). The information available includes all those items that permit billing, namely:
  billing based on consumption, thanks to the traffic data captured from the entry of the control list,
  billing based on time, thanks to managing the start and stop events, and
  billing based on event/content, thanks to the indication of the reference to the contents.

In that way, the possibility is given to the operator of performing billing based on traffic thus performing time billing for live services, event billing for video on-demand services and the like, while disaggregating from the total amount the traffic component in order to avoid double billing.

This arrangement can be applied in a transparent manner to different types of content delivery architectures (both centralized and de-centralized).

The same arrangement can be used, without the triggering mechanism, to perform authorisation based on a PUSH paradigm, that is by means of pre-provisioning by a central server based on control logics not directly triggered by the network, but rather triggered by external applications.

The PULL paradigm is significant in that it provides certain improvements "on the fly" to the content delivery service. This in a manner that is completely transparent with respect to the two end points involved, namely the content requester CR and the server providing the service. Based on the characteristics of the triggering/filtering device and the control functions possibly provided by an external server, the arrangement described herein can be used for other purposes.

Exemplary of this are the following.

Supporting dynamic quality of service (QoS). Following a request for access to a certain content, the server 22 may detect the specific requirements and generate a reservation request towards a QoS managing system, for the requested bandwidth and for the duration of the content, by using the surrogate server and the content requester as the end point. Alternatively, the possibility exists of communicating directly with the gateway 20 in order to tag the return frames from the content server with the certain service level.

Alternatively, the same arrangement may be used for supporting external application portals, by controlling and authorising in a transparent manner, the access by third parties to the contents of a portal, without the need of providing this function in a native manner.

Still alternatively, the same arrangement can be used for the controlled re-direction of requests toward real-time prefixed attributes. This leads to a redirection mechanism of the user's request by re-constructing from scratch the URL. In that way, a request can be adapted according to specific attributes of the user and given criteria that may be possibly derived from external systems such as:
  a real-time information concerning localisation in order to change, for instance, a request for www.restaurants.it into restaurants.it/Milan;
  depending on time of day, by possibly transforming a request of the type www.rai.it/lastnews into a more general request such as rai.it/eveningnews;
  depending on the available bandwidth, by transforming request of the type www.trailer.it/mickey into a request www.trailer.it/30 Kb/mickey;
  depending on the characteristics of the user terminal. This may be for instance based on detecting a mobile network context by means of the IP address and the IMEI (International Mobile Equipment Identity) identifier while deriving therefrom specific hardware characteristics (display, capabilities, and so on). A generic request towards a certain content may thus be transformed into a request adapted to the hardware characteristics of the receiver.

As a rule, the interception and triggering mechanism available with the gateway 20 evaluates certain characteristics in real time, while permitting a decision to be taken as to the best way of serving the content requested.

A gateway as described in the foregoing may be implemented, optionally:
  directly in the surrogate server (cluster),
  directly in a network element included in the traffic flow between the user and the server (cluster),
  by means of a dedicated appliance inserted in a transparent manner in the network infrastructure in the traffic flow between the user and the surrogate server (cluster), this option been considered a preferred embodiment.

The security server that implements the verification mechanism on access may be implemented optionally:
  as a derivation of a generic AAA server with an access plug-in toward the user capabilities for the content,
  as a derivation of a generic security server with a similar plug-in, and
  as a dedicated system for security content awareness, this being currently considered as a preferred embodiment.

The device is preferably arranged, and still preferably co-located, together with the content server (service centre or CDN sites). As an alternative, it may be arranged in the access network, downstream of the first existing IP device.

It is thus evident that, without prejudice to the basic principles of the invention, the details and embodiments may vary, also significantly, with respect to what has been described, by way of example only, without departing from the scope of the invention as defined by the claims that follow.

The invention claimed is:

1. A method of handling transactions in a communication network, said transactions comprising at least one technology-dependent request for a given content made by a requester to at least one server, comprising the steps of:
  making available an access content list comprising:
    permit/deny access clauses regulating access of said requester to contents provided by said at least one server, said at least one server being able to handle content requests independent of a specified technology used for delivering requested content;
detecting said technology-dependent request after establishing a connection between the requester and the at least one server irrespective of said permit/deny access clauses;
extracting from said technology-dependent request information identifying the requester making the request and the content requested;
generating from the information extracted from said technology-dependent request a corresponding technology-independent access content entry;
checking said entry against said list to derive permit/deny information concerning the request detected; and
handling said request as a function of said permit/deny information derived.

2. The method of claim 1, comprising as a function of said permit/deny information derived, the alternative steps of:
i) forwarding the request detected toward said at least one server; and
ii) either dropping said request or forwarding said request to an alternative destination.

3. The method of claim 1, comprising irrespective of said permit/deny information derived, the step of forwarding said request detected toward said at least one server and, as a function of said permit/deny information derived, the alternative steps of:
i) blocking the transaction associated with said request detected; and
ii) letting the transaction associated with said request continue.

4. The method of claim 3, wherein said step of blocking is performed by blocking a response data flow from said at least one server to the requester making said request detected.

5. The method of claim 3, wherein said step of blocking is delayed with respect to deriving of said permit/deny information.

6. The method of claim 1, wherein said access content entry comprises:
identifier attributes of the requester making the request detected;
identifier attributes of the content requested; and
identifier attributes of said at least one server to which the request is made.

7. The method of claim 1, comprising the step of providing a gateway function between said requester and said at least one server.

8. The method of claim 7, comprising the steps of:
configuring said gateway function to perform at least one of said steps of detecting, extracting, generating, and handling; and
associating with said gateway function a content policy server function to perform said step of checking.

9. The method of claim 8, comprising the step of providing said gateway function with interface functions with said requesters and said at least one server as well as with respect to said content policy server function, respectively.

10. The method of claim 7, comprising the step of providing in said gateway function:
a kernel level providing networking, bridging and IP level filtering functions related to detecting said request; and
an application level for performing said steps of extracting and generating.

11. The method of claim 10, wherein said kernel level is configured for performing at least one of the steps of:
filtering data flows exchanged between said requesters and said at least one server;
diverting said data flows toward said application level; and
re-injecting said data flows in said network.

12. The method of claim 11, comprising the step of performing said filtering as IP packet filtering.

13. The method of claim 12, comprising the step of performing said IP filtering as up to level 4 IP packet filtering.

14. The method of claim 10, comprising the step of performing at said application level the steps of:
extracting from said request, information identifying said requester and the content requested;
forwarding said information extracted toward said content policy server function; and
controlling said kernel level.

15. The method of claim 1, comprising the step of detecting said request by leaving said request unaltered.

16. The method of claim 1, wherein said step of extracting comprises the analysis of packets included in said request.

17. The method of claim 16, wherein said analysis is performed in the form of level 7 analysis.

18. The method of claim 1, comprising the step of generating, based on said permit/deny information, at least one reservation request toward a quality of service managing system.

19. The method of claim 2, comprising the step of re-directing said user request by selectively modifying an identifier associated therewith.

20. The method of claim 2, comprising the steps of:
detecting information as to the terminal associated with the requester making said request detected; and
modifying said request detected as a function of said information as to the terminal associated with the requester.

21. A system for handling transactions in a communication network, said transactions comprising at least one technology-dependent request for a given content made by a requester to at least one server, comprising:
a network device;
a gateway configured to include an access content list, the access content list comprising:
permit/deny access clauses regulating access of said requester to contents provided by said at least one server, said at least one server being able to handle content requests independent of a specified technology used for delivering requested content, and
wherein the at least one server, is communicatively coupled to the gateway, and the at least one server includes a processor and at least one request processing module, the at least one request processing module including sub-modules configured for:
detecting said technology-dependent request after establishing a connection between the requester and the at least one server irrespective of said permit/deny access clauses,
extracting from said technology-dependent request information identifying the requester making the request and the content requested,
generating from the information extracted from said technology-dependent request a corresponding technology-independent access content entry,
checking said entry against said list to derive permit/deny information concerning the request detected, and
handling said request as a function of said permit/deny information derived.

22. The system of claim 21, wherein said at least one processing module is configured for performing, as a function of said permit/deny information derived, the alternative steps of:

i) forwarding the request detected toward said at least one server; and
ii) either dropping said request or forwarding said request to an alternative destination.

23. The system of claim 21, wherein said at least one processing module is configured for performing, irrespective of said permit/deny information derived, the step of forwarding said request detected toward said at least one server and, as a function of said permit/deny information derived, the alternative steps of:
i) blocking the transaction associated with said request detected; and
ii) letting the transaction associated with said request continue.

24. The system of claim 23, wherein said at least one processing module is configured for performing said step of blocking by blocking a response data flow from said at least one server and the requester making said request detected.

25. The system of either of claim 23, wherein said at least one processing module is configured for performing said step of blocking as a step delayed with respect to deriving of said permit/deny information.

26. The system of claim 21, wherein said access content entry comprises:
identifier attributes of the requester making the request detected;
identifier attributes of the content requested; and
identifier attributes of said at least one server to which the request is made.

27. The system of claim 21, wherein said gateway is located between said requester and said at least one server.

28. The system of claim 27, wherein said gateway:
is configured to perform at least one of said steps of detecting, extracting, generating, and handling; and
has an associated content policy server to perform said step of checking.

29. The system of claim 28, wherein said gateway is provided with interface functions with said requesters and said at least one server as well as with respect to said content policy server function, respectively.

30. The system of claim 27, wherein said gateway comprises:
a kernel level, providing networking, bridging and IP level filtering functions related to detecting said request; and
an application level for performing said steps of extracting and generating.

31. The system of claim 30, wherein said kernel level is configured for performing at least one of the steps of:
filtering data flows exchanged between said requesters and said at least one server;
diverting said data flows toward application level; and
re-injecting said data flows in said network.

32. The system of claim 31, wherein said gateway is configured for performing said filtering as IP packet filtering.

33. The system of claim 32, wherein said gateway is configured for performing said IP filtering as up to level 4 IP packet filtering.

34. The system of claim 30, wherein said application level is configured for:
extracting from said request information identifying said requester and, the content requested;
forwarding said information extracted toward said content policy server function; and
controlling said kernel level.

35. The system of claim 21, wherein said at least one processing module is configured for detecting said request by leaving said request unaltered.

36. The system of claim 21, wherein said at least one processing module is configured for analysing packets included in said request.

37. The system of claim 36, wherein said at least one processing module is configured for performing said analysis in the form of level 7 analysis.

38. The system of claim 21, wherein said at least one processing module is configured for generating, based on said permit/deny information at least one reservation request toward a quality of service managing system.

39. The system of claim 22, wherein said at least one processing module is configured for re-directing said user request by selectively modifying an identifier associated therewith.

40. The system of claim 22, wherein said at least one processing module is configured for:
detecting information as to the terminal associated with the requester making said request detected; and
modifying said request detected as a function of said information as to the terminal associated with the requester.

41. A communication network comprising a system according to claim 21.

42. A non-transitory computer readable storage medium encoded with a computer program product stored in the memory of at least one computer and comprising software code portions for performing the method of claim 1.

* * * * *